US012755400B2

(12) United States Patent
Yang et al.

(10) Patent No.: US 12,755,400 B2
(45) Date of Patent: Oct. 6, 2026

(54) TARGET TRACKING METHOD AND ELECTRONIC DEVICE

(71) Applicant: Honor Device Co., Ltd., Shenzhen (CN)

(72) Inventors: Chen Yang, Shenzhen (CN); Yonghua Wang, Shenzhen (CN); Guoqiao Chen, Shenzhen (CN); Zuochao Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 255 days.

(21) Appl. No.: 18/705,419

(22) PCT Filed: Nov. 23, 2023

(86) PCT No.: PCT/CN2023/133543
§ 371 (c)(1),
(2) Date: Apr. 26, 2024

(87) PCT Pub. No.: WO2024/179060
PCT Pub. Date: Sep. 6, 2024

(65) Prior Publication Data

US 2025/0232452 A1 Jul. 17, 2025

(30) Foreign Application Priority Data

Feb. 27, 2023 (CN) ......................... 202310212380.4

(51) Int. Cl.
*G06T 7/246* (2017.01)
*G06V 10/82* (2022.01)

(52) U.S. Cl.
CPC .............. *G06T 7/246* (2017.01); *G06V 10/82* (2022.01); *G06T 2207/10016* (2013.01)

(58) Field of Classification Search
CPC ...... G06V 10/82; G06V 10/764; G06V 10/25; G06V 20/46; G06V 20/52; G06V 40/10;
(Continued)

(56) References Cited

U.S. PATENT DOCUMENTS

2010/0197392 A1 8/2010 Geiss
2014/0185925 A1 7/2014 Datta et al.
(Continued)

FOREIGN PATENT DOCUMENTS

CN 107452023 A 12/2017
CN 107871134 A 4/2018
(Continued)

OTHER PUBLICATIONS

A. Pramanik, S. K. Pal, J. Maiti and P. Mitra, "Granulated RCNN and Multi-Class Deep SORT for Multi-Object Detection and Tracking," in IEEE Transactions on Emerging Topics in Computational Intelligence, vol. 6, No. 1, pp. 171-181, Feb. 2022 (Year: 2022).*
(Continued)

*Primary Examiner* — Alex Kok S Liew
(74) *Attorney, Agent, or Firm* — Conley Rose, P.C.

(57) ABSTRACT

A target tracking method and an electronic device. The method includes, when a first region displays an $n^{th}$ frame of a video stream, receiving a first operation input to the $n^{th}$ frame of image by a user; in response to the first operation, performing feature extraction on the $n^{th}$ frame of image, to obtain a template feature, where the $n^{th}$ frame of image includes a target; determining, through a first network based on the template feature, whether an $(n+x)^{th}$ frame of image of the video stream includes the target; and if it is determined, through the first network, that the $(n+x)^{th}$ frame of image does not include the target, determining, through a second network based on the template feature, whether the $(n+x)^{th}$ frame of image includes the target, where the first (Continued)

network and the second network satisfy at least one condition in a first preset condition.

20 Claims, 25 Drawing Sheets

(58) Field of Classification Search
CPC ...... G06V 10/26; G06V 10/62; G06V 10/454; G06V 10/7715; G06V 20/50; G06V 10/774; G06V 20/41; G06V 20/58; G06V 10/255; G06V 10/803; G06V 20/49; G06V 20/64; G06V 40/103; G06V 40/23; G06V 10/235; G06V 10/267; G06V 10/772; G06V 10/806; G06V 20/20; G06V 2201/031; G06V 10/40; G06V 10/751; G06V 10/757; G06V 10/759; G06V 10/809; G06V 10/95; G06V 20/56; G06V 20/582; G06V 20/588; G06V 2201/07; G06V 10/20; G06V 10/58; G06V 10/74; G06V 10/761; G06V 10/945; G06V 10/98; G06V 20/70; G06V 40/20
See application file for complete search history.

(56) References Cited

U.S. PATENT DOCUMENTS

| | | | |
|---|---|---|---|
| 2018/0174046 A1 | 6/2018 | Xiao et al. | |
| 2019/0114804 A1 | 4/2019 | Sundaresan et al. | |
| 2020/0026999 A1 | 1/2020 | Wang et al. | |
| 2020/0111267 A1* | 4/2020 | Stauber | G06F 3/011 |
| 2020/0258242 A1 | 8/2020 | Liu et al. | |
| 2021/0011147 A1 | 1/2021 | Va et al. | |
| 2021/0019627 A1 | 1/2021 | Zhang et al. | |
| 2021/0327076 A1 | 10/2021 | Sun et al. | |

FOREIGN PATENT DOCUMENTS

| | | |
|---|---|---|
| CN | 109325967 A | 2/2019 |
| CN | 109685826 A | 4/2019 |
| CN | 109741364 A | 5/2019 |
| CN | 110443827 A | 11/2019 |
| CN | 110503662 A | 11/2019 |
| CN | 110827314 A | 2/2020 |
| CN | 111247526 A | 6/2020 |
| CN | 111582062 A | 8/2020 |
| CN | 111652181 A | 9/2020 |
| CN | 111695392 A | 9/2020 |
| CN | 111815677 A | 10/2020 |
| CN | 112016371 A | 12/2020 |
| CN | 112052837 A | 12/2020 |
| CN | 112287906 A | 1/2021 |
| CN | 114255257 A | 3/2022 |
| CN | 114581678 A | 6/2022 |
| CN | 114708300 A | 7/2022 |
| CN | 115205326 A | 10/2022 |
| CN | 116309710 A | 6/2023 |
| WO | 2018133666 A1 | 7/2018 |
| WO | 2021012484 A1 | 1/2021 |

OTHER PUBLICATIONS

Meimetis, D., Daramouskas, I., Perikos, I. et al. Real-time multiple object tracking using deep learning methods. Neural Comput & Applic 35, 89-118, 2023 (Year: 2023).*

T. Meinhardt, A. Kirillov, L. Leal-Taixe and C. Feichtenhofer, “TrackFormer: Multi-Object Tracking with Transformers,” 2022 IEEE/CVF Conference on Computer Vision and Pattern Recognition (CVPR), New Orleans, LA, USA, 2022, pp. 8834-8844 (Year: 2022).*

Li, J., et al., “Application of Target Two-Time Extraction Method in High Frame Rate Video Tracker”, Journal of Ordnance Equipment Engineering, 2017(6), doi: 10.11809 /scbgxb2017.06.014, Jun. 25, 2017, 4 pages.

Liu, Y., et al., “Object Tracking Based on Deep CNN Features Together with Color Features and Sparse Representation,” 2019 IEEE Symposium Series on Computational Intelligence (SSCI), Xiamen, China, 2019, pp. 1565-1568.

Ying, C., et al., “Depth-Adaptive Computational Policies for Efficient Visual Tracking”, Mar. 22, 2018 (Mar. 22, 2018), Sat 2015 18th International Conference, Austin, TX, USA, Sep. 24-27, 2015; Springer, Berlin, Heidelberg, pp. 109-122.

* cited by examiner (a) (b) (c)

(a) (b) (c) (d)

(a) (b) (c) (d)

TARGET TRACKING METHOD AND ELECTRONIC DEVICE

CROSS-REFERENCE TO RELATED APPLICATIONS

This is a U.S. National Stage of International Application No. PCT/CN2023/133543 filed on Nov. 23, 2023, which claims priority to Chinese Patent Application No. 202310212380.4, filed with the China National Intellectual Property Administration on Feb. 27, 2023, both of which are incorporated herein by reference in its their entireties.

TECHNICAL FIELD

This application relates to the field of electronic technologies, and in particular to a target tracking method and an electronic device.

BACKGROUND

Visual object tracking (visual object tracking), also known as target tracking, is to position a specific target in each frame of image in a video stream. At present, target tracking is used in various fields and scenarios, such as an automatic driving scenario, a scenario in which sports events are broadcast, a security monitoring scenario, a scenario in which tracking and shooting are performed by an unmanned aerial vehicle, and a scenario in which an electronic device, for example, a mobile phone, shoots an image and records a video, and the like.

In a target tracking method in a conventional technology, when a target is tracked, if the target is deformed, moves, or is locally covered, a tracked target tends to be lost.

SUMMARY

This application provides a target tracking method and an electronic device. Through target searching performed on a target in a difficult scenario, tracking accuracy is improved, and possibility that target tracking is lost is reduced.

According to a first aspect, this application provides a target tracking method. The method is performed by an electronic device, and includes:

displaying a first shooting interface, where a first region of the first shooting interface is used to display a video stream shot by a camera lens; when the first region displays an $n^{th}$ frame of the video stream, receiving a first operation input to the $n^{th}$ frame of image by a user, where n is a positive integer, in response to the first operation, performing feature extraction on the $n^{th}$ frame of image, to obtain a template feature, where the $n^{th}$ frame of image includes a target; determining, through a first network based on the template feature, whether an $(n+x)^{th}$ frame of image of the video stream includes the target, where x is a positive integer; if it is determined, through the first network, that the $(n+x)^{th}$ frame of image does not include the target, determining, through a second network based on the template feature, whether the $(n+x)^{th}$ frame of image includes the target, where the first network and the second network satisfy at least one condition in a first preset condition; and the first preset condition includes: a network depth of the second network is greater than a network depth of the first network, a network width of the second network is greater than a network width of the first network, and a resolution of an input image of the second network is greater than a resolution of an input image of the first network.

Optionally, the first shooting interface may be a shooting preview interface, for example, an image shooting preview interface or a video recording preview interface. The first shooting interface may alternatively be an actual video shooting interface, for example, a video recording interface.

Optionally, the first operation may be a pre-set operation for inputting a tracking instruction, or a pre-set operation for inputting a tracking and focusing (which may be referred to as focus tracking) instruction. The first operation may, for example, be a tap operation.

The first network and the second network are used to process an image in the video stream based on the template feature, to determine whether the image includes the target. Optionally, the first network and the second network each may be a search network, or referred to as a tracking network. The first network and the second network satisfy at least one of the first preset conditions, that is, at least one of the network depth, the network width, and the resolution of the input image of the second network is greater than the network depth, the network width, and the resolution of the first network. If the network depth and/or the network width of the second network is greater than the network depth and/or the network width of the first network, a search depth of a second network on the target is greater than a search depth of the first network on the target. In other words, compared to the second network, the first network is a shallow search network, and/or, the first network is a tracking network with a low resolution.

In the target tracking method provided in the first aspect of this embodiment of this application, after inputting the first operation on an $n^{th}$ frame of image including the target, the user performs feature extraction on the $n^{th}$ frame of image, to obtain the template feature. Then, for an $(n+x)^{th}$ frame of image after the $n^{th}$ frame, the target is searched through the first network and the second network based on the template feature. At least one of the network depth, the network width, and the resolution of the input image of the second network is greater than the network depth, the network width, and the resolution of the first network. In this way, in a target tracking process, it is first determined whether the $(n+x)^{th}$ frame of image includes the target through the first network. If it is determined, through the first network, that the $(n+x)^{th}$ frame does not include a target, it is determined, through the second network, whether the $(n+x)^{th}$ frame of image includes the target. To be specific, a target search depth is further increased or the resolution of the input image is further increased through the second network. Alternatively, the search depth and the resolution of the input image are further increased in a plurality of dimensions, to improve accuracy of searching. In this way, for target tracking in a difficult scenario, tracking accuracy is improved, and possibility that target tracking is lost is reduced. In addition, in the target tracking process, it is determined, based on a search result of the first network, whether to deepen the search depth through the second network or increase the resolution of the input image. In comparison to tracking through only the second network, the method may prevent non-essential deep search or high-resolution search in a non-difficult scenario. Therefore, operation complexity of an algorithm is reduced, the real-time performance of target tracking is improved, and power consumption of a device is reduced. In conclusion, in the method provided in this embodiment of this application, the first network and the second network may be adaptively selected, to achieve balance between tracking accuracy and power consumption and balance between tracking accuracy and real-time performance.

With reference to the first aspect, in some implementations of the first aspect, the method further includes: if it is determined, through the second network, that the $(n+x)^{th}$ frame of image does not include the target, determining, through a third network based on the template feature, whether the $(n+x)^{th}$ frame of image includes the target, where the second network and the third network satisfy at least one condition in a second preset condition; and the second preset condition includes: a network depth of the third network is greater than the network depth of the second network, a network width of the third network is greater than the network width of the second network, and a resolution of an input image of the third network is greater than the resolution of the input image of the second network.

In this implementation, in addition to the first network and the second network, in the method, deep searching and/or high-resolution searching are/is further performed on the target through the third network. The first network, the second network, and the third network are in a progressive relationship in one or more of three dimensions, namely, the network depth, the network width, and the resolution of the input image. In this way, in the target tracking process, if it is determined, through the second network, that the $(n+x)^{th}$ frame of image does not include the target, it is further determined, through the third network, whether the target is included, to further increase the target search depth and/or to increase the resolution of the input image, and further improve accuracy of target searching. For target tracking in the difficult scenario, tracking accuracy is further improved, and possibility that target tracking is lost is reduced.

In a possible implementation, at least one of the network depth and the network width of the second network is greater than at least one of the network depth and the network width of the first network, at least one of the network depth and the network width of the third network is greater than at least one of the network depth and the network width of the first network, and the resolution of the input image of the third network is separately greater than the resolution of the input image of the first network and the resolution of the input image of the second network.

To be specific, by contrast, the first network is a shallow search network with a low resolution, the second network is a deep search network with a low resolution, and the third network is a deep search network with a high resolution. In this way, the first network, the second network, and the third network have a more proportional progression relationship in the search depth and the resolution, so that the balance between target tracking accuracy and power consumption and the balance between target tracking accuracy and real-time performance are improved.

In a possible implementation, the determining, through a first network based on the template feature, whether an $(n+x)^{th}$ frame of image of the video stream includes the target includes: selecting a first tracking region from the $(n+x)^{th}$ frame of image; searching the first tracking region through the first network based on the template feature, and outputting a first position and a first confidence that corresponds to the first position; if the first confidence is greater than a first confidence threshold, determining, through the first network, that the $(n+x)^{th}$ frame of image includes the target; or if the first confidence is less than or equal to the first confidence threshold, determining, through the first network, that the $(n+x)^{th}$ frame of image does not include the target.

In this implementation, the first tracking region is selected from the $(n+x)^{th}$ frame of image, and the $(n+x)^{th}$ frame of image is searched through the first network, to determine whether the $(n+x)^{th}$ frame of image includes the target. To be specific, local searching is performed on the $(n+x)^{th}$ frame of image through the first network, to determine whether the $(n+x)^{th}$ frame of image includes the target. In the target tracking process, scenarios are non-difficult scenarios. Therefore, in this implementation, when a first search is performed on $(n+x)^{th}$ frame of image, local searching is performed first, to reduce the operation complexity of the algorithm, improve operation efficiency of the algorithm, reduce power consumption of the device, and improve the real-time performance of target tracking.

In a possible implementation, the selecting a first tracking region from the $(n+x)^{th}$ frame of image includes: selecting a portion of a region in the $(n+x)^{th}$ frame of image based on a position of the target in a $(n+x-1)^{th}$ frame of image of the video stream, to obtain the first tracking region.

In other words, the first tracking region is selected from the $(n+x)^{th}$ frame of image based on a position of the target in a last frame of image. During movement of the target, the position of the target in the image moves gradually. Therefore, the first tracking region is selected from the $(n+x)^{th}$ frame of image based on the position of the target in the last frame of image, and then the target is searched. This improves a success rate of target searching, and improves a success rate of target tracking.

In a possible implementation, the method further includes: if it is determined, through the first network, that the $(n+x)^{th}$ frame of image includes the target, outputting the first position, where the first position represents a position of the target in the $(n+x)^{th}$ frame of image.

To be specific, when target searching is performed on the $(n+x)^{th}$ frame of image through the first network, if target searching is successful, the first position is output. The first position is the position of the target in the $(n+x)^{th}$ frame of image. After this step, it may be assumed that x=x+1, step of determining, through a first network based on the template feature, whether an $(n+x)^{th}$ frame of image of the video stream includes the target is performed, to implement target tracking on a next frame of image.

In a possible implementation, the determining, through a second network based on the template feature, whether the $(n+x)^{th}$ frame of image includes the target, includes: searching the first tracking region through the second network based on the template feature, and outputting a second position and a second confidence that corresponds to the second position; if the second confidence is greater than a second confidence threshold, determining, through the second network, that the $(n+x)^{th}$ frame of image includes the target; or if the second confidence is less than or equal to a second confidence threshold, determining, through the second network, that the $(n+x)^{th}$ frame of image does not include the target.

In this implementation, when target searching is performed through the second network, the first tracking region is searched, that is, local searching is performed on the $(n+x)^{th}$ frame of image through the second network. In this way, when targeting searching is performed through the second network, only the search depth is increased, and a search range is not expanded. This prevents over-searching, reduces the operation complexity of the algorithm, improves the real-time performance of target tracking, and reduces the power consumption of the device.

In a possible implementation, the method further includes: if it is determined, through the second network, that the $(n+x)^{th}$ frame of image includes the target, outputting the second position, where the second position represents the position of the target in the $(n+x)^{th}$ frame of image.

To be specific, when target searching is performed on the $(n+x)^{th}$ frame of image through the second network, if target searching is successful, the second position is output. The second position is the position of the target in the $(n+x)^{th}$ frame of image. After this step, it may be assumed that x=x+1, step of determining, through a first network based on the template feature, whether an $(n+x)^{th}$ frame of image of the video stream includes the target is performed, to implement target tracking on a next frame of image.

In a possible implementation, a search range of the third network for the $(n+x)^{th}$ frame of image is separately greater than a search range of the first network for the $(n+x)^{th}$ frame of image and a search range of the second network for the $(n+x)^{th}$ frame of image.

In a possible implementation, the determining, through a third network, whether the $(n+x)^{th}$ frame of image includes: performing region division on the $(n+x)^{th}$ frame of image, to obtain a plurality of second tracking regions; separately searching in the plurality of second tracking regions through the third network based on the template feature, and outputting a plurality of third positions and third confidences that correspond to the third positions; if a third target confidence that is larger than a third confidence threshold exists in the plurality of third confidences, determining, through the third network, that the $(n+x)^{th}$ frame of image includes the target; or if a third target confidence does not exist in the plurality of third confidences, determining, through the third network, that the $(n+x)^{th}$ frame of image does not include the target.

In the two implementations, when the target is searched through the third network, the search depth and/or the resolution of the input image are/is increased, and the search range is expanded. In this way, accuracy of searching is further improved. Therefore, the target tracking accuracy is improved, and possibility that target tracking is lost is reduced.

In a possible implementation, a resolution of at least one second tracking region in the plurality of second tracking regions is greater than a resolution of the first tracking region.

In this implementation, the resolution of the at least one second tracking region is greater than the resolution of the first tracking region. In this way, accuracy of target searching through the third network is higher. Therefore, target tracking accuracy is improved.

In a possible implementation, the method further includes: if it is determined, through the third network, that the $(n+x)^{th}$ frame of image includes the target, outputting a third target position, where the third target position is a third position corresponding to the third target confidence, and the third target position represents the position of the target in the $(n+x)^{th}$ frame of image; or if it is determined, through the third network, that the $(n+x)^{th}$ frame of image does not include the target, stopping tracking the target.

In this implementation, if target searching is successful through the third network, a position obtained after this searching is determined as the position of the target in the $(n+x)^{th}$ frame of image. After this step, it may be assumed that x=x+1, step of determining, through a first network based on the template feature, whether an $(n+x)^{th}$ frame of image of the video stream includes the target is performed, to implement target tracking on a next frame of image.

If target searching fails through the third network, tracking on the target may be stopped. Certainly, in some other embodiment, tracking on the target may not be stopped. It is assumed that x=x+1, step of determining, through a first network based on the template feature, whether an $(n+x)^{th}$ frame of image of the video stream includes the target is performed, to implement target tracking on a next frame of image.

In a possible implementation, the first operation is a tap operation, and the in response to the first operation, performing feature extraction on the $n^{th}$ frame of image, to obtain a template feature includes: in response to the first operation, determining a tap position of the first operation; selecting a target region from the $n^{th}$ frame of image based on the tap position; and performing feature extraction on the target region, to generate the template feature.

Optionally, in response to the first operation, a region within a preset range may be selected centered on the tap position of the first operation, and is determined as a target region.

In this implementation, the target region is determined based on the tap position, and then feature extraction is performed based on the target region, to generate the template feature, so that the generated template feature is more accurate. Therefore, the tracked target is more in line with intention of the user, and user experience is improved.

According to a second aspect, this application provides an apparatus. The apparatus is included in an electronic device, and has functions of implementing behavior of an electronic device according to the first aspect and possible implementations of the first aspect. The functions may be implemented by hardware or may be implemented by corresponding software executed by hardware. The hardware or the software includes one or more modules or units corresponding to the function, for example, a receiving module or unit, and a processing module or unit.

In a possible implementation, the apparatus includes: a display module, a receiving module, and a tracking module. The display module is configured to display a first shooting interface, where a first region of the first shooting interface is used to display a video stream shot by a camera lens. The receiving module is configured to: when the first region displays an $n^{th}$ frame of the video stream, receive a first operation input to the $n^{th}$ frame of image by a user, where n is a positive integer. The tracking module is configured to: in response to the first operation, perform feature extraction on the $n^{th}$ frame of image, to obtain a template feature, where the $n^{th}$ frame of image includes a target; determine, through a first network based on the template feature, whether an $(n+x)^{th}$ frame of image of the video stream includes the target, where x is a positive integer; and if it is determined, through the first network, that the $(n+x)^{th}$ frame of image does not include the target, determine, through a second network based on the template feature, whether the $(n+x)^{th}$ frame of image includes the target, where the first network and the second network satisfy at least one condition in a first preset condition. The first preset condition includes: a network depth of the second network is greater than a network depth of the first network, a network width of the second network is greater than a network width of the first network, and a resolution of an input image of the second network is greater than a resolution of an input image of the first network.

According to a third aspect, this application provides an electronic device. The electronic device includes a processor, a memory, and an interface. The processor, the memory, and the interface cooperate with each other, so that the electronic device performs any one of the methods in the technical solutions in the first aspect.

According to a fourth aspect, this application provides a chip, including a processor. The processor is configured to read and execute a computer program stored in a memory, to perform the method according to the first aspect and any possible implementation of the first aspect.

Optionally, the chip further includes a memory, and the memory is connected to the processor through a circuit or a wire.

Further, optionally, the chip further includes a communication interface.

According to a fifth aspect, this application provides a computer-readable storage medium, the computer-readable storage medium storing a computer program, and the computer program, when executed by a processor, enabling the processor to perform any method in the technical solutions of the first aspect.

According to a sixth aspect, this application provides a computer program product. The computer program product includes computer program code, and when the computer program code is run on an electronic device, the electronic device is enabled to perform any one of the methods in the technical solutions in the first aspect.

DETAILED DESCRIPTION OF THE EMBODIMENTS

Figure 1:
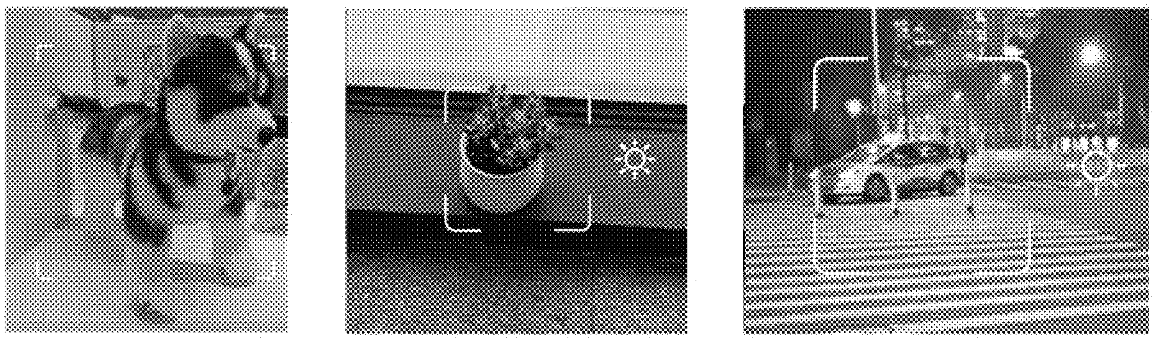
FIG. 1 is a schematic diagram of an interface of target tracking according to an embodiment of this application.

Technical solutions in embodiments of this application are described below with reference to the accompanying drawings in embodiments of this application. In descriptions in embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of embodiments of this application, "a plurality of" represents two or more.

The terms "first", "second", and "third" mentioned below are merely intended for an objective of description, and shall not be understood as an indication or implication of relative importance or implicit indication of the quantity of indicated technical features. Therefore, features defining "first", "second", and "third" may explicitly or implicitly include one or more such features.

Reference to "one embodiment" or "some embodiments" described in this specification of this application means that a specific characteristic, structure, or feature described in combination with the embodiment is included in one or more embodiments of this application. Therefore, the statements "in one embodiment", "in some embodiments", "in some other embodiments", "in still some other embodiments" appearing at different positions in this specification of this application do not necessarily refer to the same embodiment, but mean "one or more but not all embodiments", unless otherwise particularly emphasized in other ways. The terms "include", "include", "have", and variants thereof all mean "include but are not limited to", unless otherwise specifically emphasized in another manner.

In order to better understand embodiments of this application, terms or concepts that may be involved in embodiments are explained and described below.

1. Neural Network

A neural network (neural network, NN), called a connection model (connection model), is referred to as a network. The neural network is an algorithmic mathematical model that imitates behavioral features of an animal neural network and that performs processing on information in a distributed and parallel manner. Such network performs, based on complexity of a system, information processing by adjusting an interconnection between a large quantity of inner nodes.

The neural network may include a feed-forward neural network, a back propagation (back propagation, BP) neural network, a convolutional neural network (convolutional neural network, CNN), and the like.

2. Network Width

A network width means a quantity of channels (channels) in a neural network, or a quantity of filters. If a network is wider, a capability of extracting a target feature is stronger. That is, one layer of the network may learn more rich features, for example, texture features in different directions, different frequencies, and the like. In other words, the network width determines an amount of information learned by the network at a specific layer.

3. Network Depth

A network depth means a quantity of network layers (layers) in a neural network, for example, a network depth of a residual network (residual network, resnet) 18 is 18, which means that the network has 18 network layers. If the network depth is larger, a learning capability is stronger. A convolutional neural network is used as an example. Network layers of the convolutional neural network perform abstraction learning on input image data layer by layer. For example, a first layer learns an edge feature of an image, a second layer learns a simple shape feature, and a third layer learns a feature of a target shape. Therefore, the network depth determines a representation (abstraction) capability of the network. If the network depth is larger (that is, the network is deeper), the learning capability is stronger.

In conclusion, to a specific extent, when the network is deeper and wider, a feature extraction capability of the network is stronger, and accuracy of the network is higher. In embodiments of this application, a target searching process based on a network with deeper network depth and/or a network with a wider network width is referred to as a large search depth for a target, or referred to as deep searching.

The technical problems and devices to which methods are applied in embodiments of this application are described below.

Target tracking is widely used in various technical fields and application scenarios, such as an automatic driving scenario, a scenario in which sports events are broadcast, a security monitoring scenario, a scenario in which tracking and shooting are performed by an unmanned aerial vehicle, and a scenario in which an electronic device, for example, a mobile phone, shoots an image and records a video (that is, video shooting), and the like. A scenario in which a mobile phone shoots an image or records a video is used as an example. When the mobile phone shoots an image or previews a video, or when the mobile phone records a video, a target may be tracked, to facilitate preset processing on the target, for example, focusing, adjustment on brightness, and the like.

For example, FIG. 1 is a schematic diagram of an interface of target tracking according to an embodiment of this application. As shown in (a) in FIG. 1, the interface includes a dog, and the dog may be tracked, to focus on the dog. As shown in (b) in FIG. 1, the interface includes a green plant, and the green plant may be tracked, to perform preset processing on the green plant, for example, focusing, adjustment on brightness, and the like. As shown in (c) in FIG. 1, the interface includes a vehicle, and the vehicle may be tracked, to perform preset processing on the vehicle and a surrounding region, for example, focusing, adjustment on brightness, and the like.

In a conventional technology, in a target tracking process, if a target is in scenarios such as deformation, movement, partial occlusion, and the like (referred to as difficult scenarios), target tracking is easy to lose.

In a target tracking method provided in embodiments of this application, a target is searched based on a local shallow search network with a low resolution (referred to as a local shallow network, also called a first network), a local deep search network with a low resolution (referred to as a local deep network, also called a second network), and a global deep search network with a high resolution (referred to as a global deep network, also called a third network model). There is a progressive relationship among network depths, network widths, resolutions of input images, and search ranges of the local shallow network, the local deep network, and the global deep network. In this way, in the target tracking process, low-resolution shallow searching is first locally performed on the image through the local shallow network. If searching fails, low-resolution deep searching is locally performed on the image through the local deep network, that is, a target search depth is increased, to improve accuracy of searching. If searching still fails through the local deep network, high-resolution deep searching is globally performed on the image through the global deep network, that is, a resolution of the input image is further increased, and the search range is expanded, to further improve accuracy of searching. In this way, in the method, for target tracking in a difficult scenario, tracking accuracy is improved, and possibility that target tracking is lost is reduced. In addition, in the searching process, the search depth is gradually increased or the search range is expanded based on a search result, to prevent non-essential deep searching, high-resolution searching, or globally searching in a non-difficult scenario. This reduces operation complexity of an algorithm, improves real-time performance of target tracking, and reduces power consumption of the device.

The target tracking method provided in embodiments of this application is applicable to an electronic device that may shoot a video, such as a mobile phone, a tablet computer, a wearable device, an in-vehicle device, an augmented reality (augmented reality, AR) device/virtual reality (virtual reality, VR) device, a notebook computer, an ultra-mobile personal computer (ultra-mobile personal computer, UMPC), a netbook, a personal digital assistant (personal digital assistant, PDA), or an unmanned aerial vehicle. A specific type of the electronic device is not limited in embodiments of this application.

Figure 2:
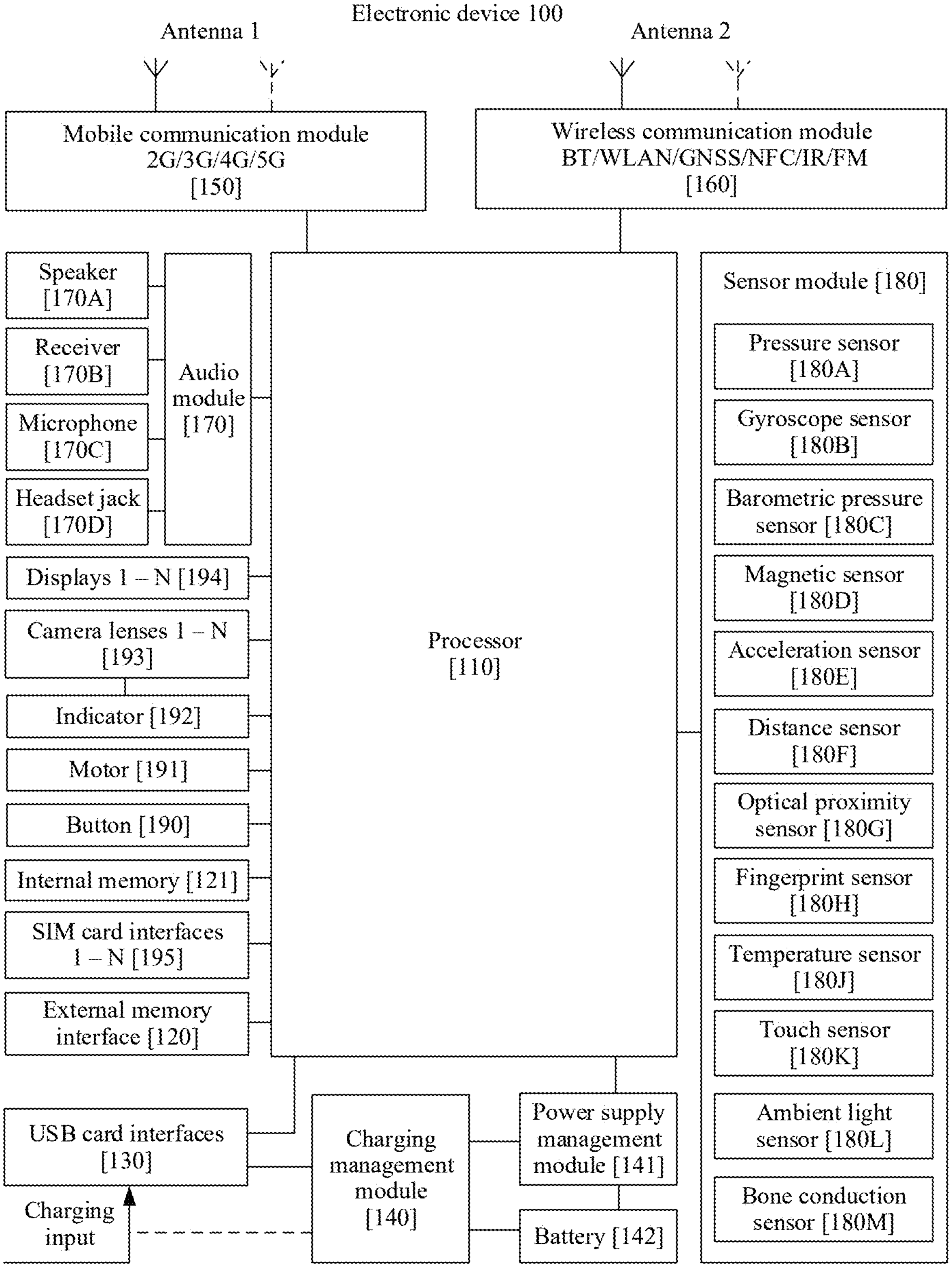
FIG. 2 is a schematic diagram of a structure of an electronic device according to an embodiment of this application.

For example, FIG. 2 is a schematic diagram of a structure of an electronic device 100 according to an embodiment of this application. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, and an audio module 170, a speaker 170A, a receiver 170B, a microphone 170C, a headset jack 170D, a sensor module 180, a button 190, a motor 191, an indicator 192, a camera lens 193, a display 194, a subscriber identification module (subscriber identification module, SIM) card interface 195, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, etc.

It may be understood that the structure illustrated in this embodiment of this application constitutes no specific limitation on the electronic device 100. In some other embodiments of this application, the electronic device 100 may include more or fewer components than those shown in the figure, some components may be combined, some components may be split, or there may be different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video encoder and decoder, a digital signal processor (digital signal processor, DSP), a baseband processor, a neural-network processing unit (neural-network processing unit, NPU), and/or the like. Different processing units may be independent devices, or may be integrated into one or more processors.

The controller may be a nerve center and a command center of the electronic device 100. The controller may generate an operation control signal based on an instruction operation code and a timing signal, and implement control on instruction fetching and instruction execution.

A memory configured to store instructions and data may be further disposed in the processor 110. In some embodiments the memory in processor 110 is a cache memory. The memory may store an instruction or data that is recently used or to be cyclically used by the processor 110. If the processor 110 needs to use the instructions or data again, the instructions or data may be directly invoked from the memory. Repeated access is avoided, and waiting time of the processor 110 is reduced, thereby improving efficiency of the system.

In some embodiments, the processor 110 may include one or more interfaces. The interface may include an inter-integrated circuit (Inter-integrated Circuit, I2C) interface, an inter-integrated circuit sound (Inter-integrated Circuit Sound, I2S) interface, a pulse code modulation (Pulse Code Modulation, PCM) interface, and a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

It may be understood that an interface connection relationship between the modules shown in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of the interface connection manners.

The charging management module 140 is configured to receive charging input from the charger. The charger may be a wireless charger, or may be a wired charger. In some embodiments of wired charging, the charging management module 140 may receive charging input from the wired charger through the USB interface 130. In some embodiments of wireless charging, the charging management module 140 may receive wireless charging input through a wireless charging coil of the electronic device 100. The charging management module 140 may supply power to the electronic device by the power management module 141 while charging the battery 142.

The power management module 141 is connected to the battery 142, the charging management module 140, and the processor 110. The power management module 141 receives an input from the battery 142 and/or the charging management module 140, and supplies power to the processor 110, the internal memory 121, the external memory, the display 194, the camera lens 193, the wireless communication module 160, and the like. The power management module 141 may further be configured to monitor parameters such as a battery capacity, a quantity of battery cycles, and a battery health status (power leakage and impedance). In some other embodiments, the power management module 141 may alternatively be arranged in the processor 110. In some other embodiments, the power management module 141 and the charging management module 140 may alternatively be arranged in a same device.

A wireless communication function of the electronic device 100 may be implemented by the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Structures of the antenna 1 and the antenna 2 in FIG. 2 are merely examples. Each antenna of the electronic device 100 may be configured to cover one or more communication bands. Different antennas may be multiplexed to increase antenna utilization. For example, the antenna 1 may be multiplexed as a diversity antenna of a wireless local area network. In some other embodiments, the antennas may be used with a tuning switch.

The mobile communication module 150 may provide a solution applied to the electronic device 100 for wireless communication including 2G/3G/4G/5G and the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal obtained after modulation by the modem processor, and convert the signal into an electromagnetic wave for radiation through the antenna 1. In some embodiments, at least some functional modules in the mobile communication module 150 may be disposed in the processor 110. In some embodiments, at least some of the functional modules of the mobile communication module 150 may be arranged in a same device as at least some of modules of the processor 110.

The modulation and demodulation processor may include a modulator and a demodulator. The modulator is configured to modulate a low frequency baseband signal to be sent into a medium and high frequency signal. The demodulator is configured to demodulate a received electromagnetic wave signal into a low frequency baseband signal. Then, the demodulator transfers, to the baseband processor for processing, the low frequency baseband signal obtained through demodulation. The low frequency baseband signal is processed by the baseband processor and then transferred to an application processor. The application processor outputs a sound signal through an audio device (which is not limited to the speaker 170A, the receiver 170B, and the like), or displays an image or a video through the display 194. In some embodiments, the modulation and demodulation processor may be an independent device. In some other embodiments, the modem processor may be independent of the processor 110, and the modem processor and the mobile communication module 150 or another functional module are disposed in a same device.

The wireless communication module 160 may provide a solution to wireless communication applied to the electronic device 100, for example, a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), and an infrared (infrared, IR) technology. The wireless communication module 160 may be one or more components integrating at least one communication processing module. The wireless communication module 160 receives an electromagnetic wave by using the antenna 2, performs frequency modulation on and filters the electromagnetic wave signal, and sends a processed signal to the processor 110. The wireless communication module 160 may further receive a to-be-sent signal from the processor 110, perform frequency modulation on and amplify the to-be-sent signal, and convert the to-be-sent signal into an electromagnetic wave by using the antenna 2 for radiation.

In some embodiments, the antenna 1 and the mobile communication module 150 of the electronic device 100 are coupled, and the antenna 2 and the wireless communication module 160 are coupled, so that the electronic device 100 can communicate with a network and another device by using a wireless communication technology. The wireless communication technology may include a global system for mobile communication (global system for mobile communication, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), and a Beidou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 100 implements a display function by using the GPU, the display 194, the application processor, and the like. The GPU is a microprocessor for image processing and connects the display 194 to the application processor. The GPU is configured to perform mathematical and geometric calculation for graphics rendering. The processor 110 may include one or more GPUs, and the GPU executes program instructions to generate or change display information.

The display 194 is configured to display, for example, an image and a video. The display 194 may include a display panel. The display panel may be a liquid crystal display (liquid crystal display, LCD), an organic light-emitting diode (organic light-emitting diode, OLED), an active-matrix organic light-emitting diode or an active-matrix organic light emitting diode (active-matrix organic light emitting diode, AMOLED), a flexible light-emitting diode (flex light-emitting diode, FLED), a Mini-Led, a Micro-Led, a Micro-oLed, a quantum dot light emitting diode (quantum dot light emitting diodes, QLED), or the like. In some embodiments, the electronic device 100 may include 1 or N displays 194, where N is a positive integer greater than 1.

The electronic device 100 may implement a photographing function through the ISP, the camera lens 193, the video encoder and decoder, the GPU, the display 194, the application processor, and the like.

The ISP is configured to handle data returned by the camera lens 193. For example, during photographing, a shutter is enabled. Light is transferred to a photosensitive element of the camera through a lens, and an optical signal is converted into an electrical signal. The photosensitive element of the camera transmits the electrical signal to the ISP for processing, and the electrical signal is converted into an image visible to a naked eye. The ISP may further perform algorithm optimization on noise, brightness, and a skin tone of the image. The ISP may further optimize parameters such as exposure and a color temperature of a photographing scenario. In some embodiments, the ISP may be disposed in the camera lens 193.

The camera lens 193 is configured to shoot a still image or a video. An optical image of an object is generated through a lens and is projected onto a photosensitive element. The photosensitive element may be a charge-coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the electronic device 100 may include 1 or N camera lenses 193. N is a positive integer greater than 1.

The digital signal processor is configured to process a digital signal. In addition to a digital image signal, the digital signal processor may further process another digital signal. For example, when the electronic device 100 performs frequency selection, the digital signal processor is configured to perform Fourier transform and the like on frequency energy.

The video encoder and decoder are configured to compress or decompress a digital video. The electronic device 100 may support one or more types of video encoders and decoders. Therefore, the electronic device 100 may play or record videos in a plurality of encoding formats, such as moving picture experts group (moving picture experts group, MPEG)1, MPEG2, MPEG3, and MPEG4.

The NPU is a neural-network (neural-network, NN) computing processor that quickly processes input information by referring to a biological neural-network structure, for example, by referring to a transfer mode between human brain neurons, and can further perform self-learning continuously. Applications such as intelligent cognition of the electronic device 100, for example, image recognition, face recognition, speech recognition, and text understanding, may be implemented by using the NPU.

An external memory interface 120 may be configured to be connected to an external memory card such as a Micro SD card, to expand a storage capability of the electronic device 100. The external storage card communicates with the processor 110 through the external memory interface 120, to implement a data storage function. For example, store files such as music and a video into the external memory card.

The internal memory 121 may be configured to store a computer-executable program code, and the executable program code includes instructions. The processor 110 runs the instructions stored in the internal memory 121, to perform various function applications and data processing of the electronic device 100. The internal memory 121 may include a program storage area and a data storage area. The program storage region may store an operating system, an application required by at least one function (such as a sound playback function and an image playback function), and the like. The data storage area may store data (such as audio data and an address book) and the like created when the electronic device 100 is used. In addition, the internal memory 121 may include a high-speed random access memory, and may also include a non-volatile memory, for example, at least one magnetic disk storage device, a flash memory device, or a universal flash storage (universal flash storage, UFS).

The electronic device 100 may implement audio functions such as music playing and sound recording through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to encode and decode the audio signal. In some embodiments, the audio module 170 may be disposed in the processor 110, or some functional modules in the audio module 170 are disposed in the processor 110.

The software system of the electronic device 100 may use a layered architecture, an event-driven architecture, a micro-core architecture, a microservice architecture, or a cloud architecture. In this embodiment of this application, the software structure of the electronic device 100 is an example described by using an Android system with a layered architecture as an example.

Figure 3:
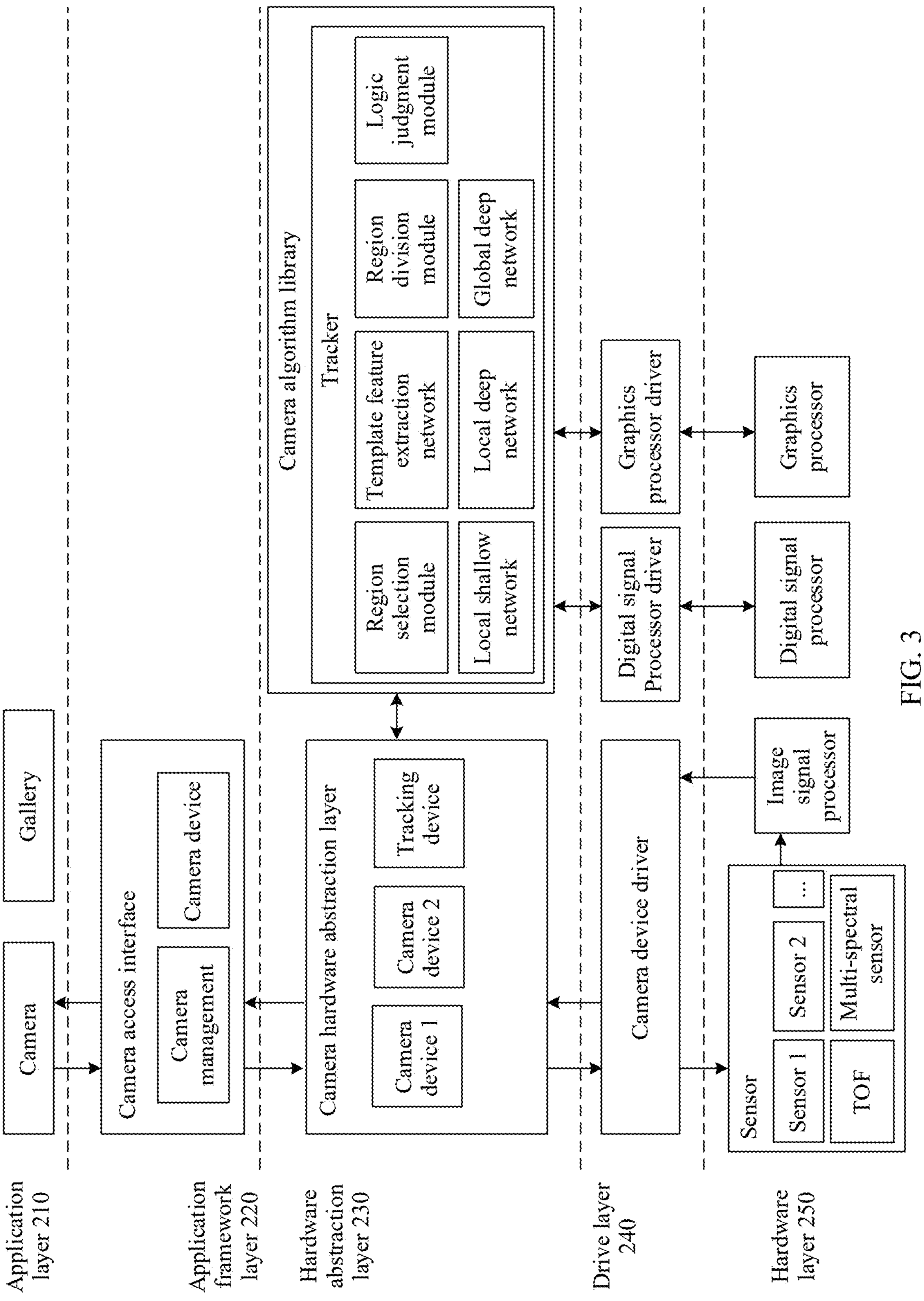
FIG. 3 is a block diagram of a software structure and a hardware structure of an electronic device according to an embodiment of this application.
Figure 4A:
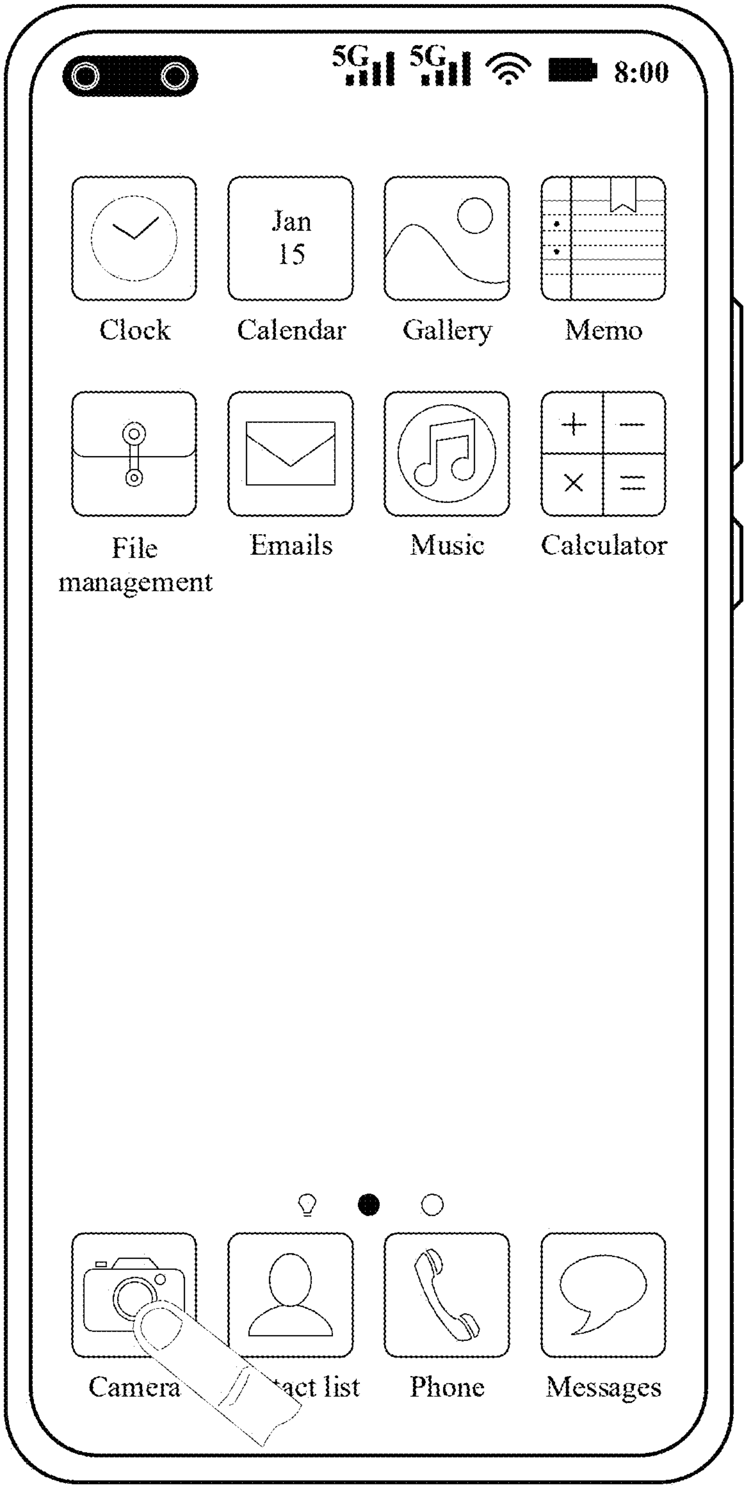
FIG. 4A to FIG. 4E are schematic diagrams of changes in an interface of target tracking in an image shooting preview scenario according to an embodiment of this application.
Figure 4B:
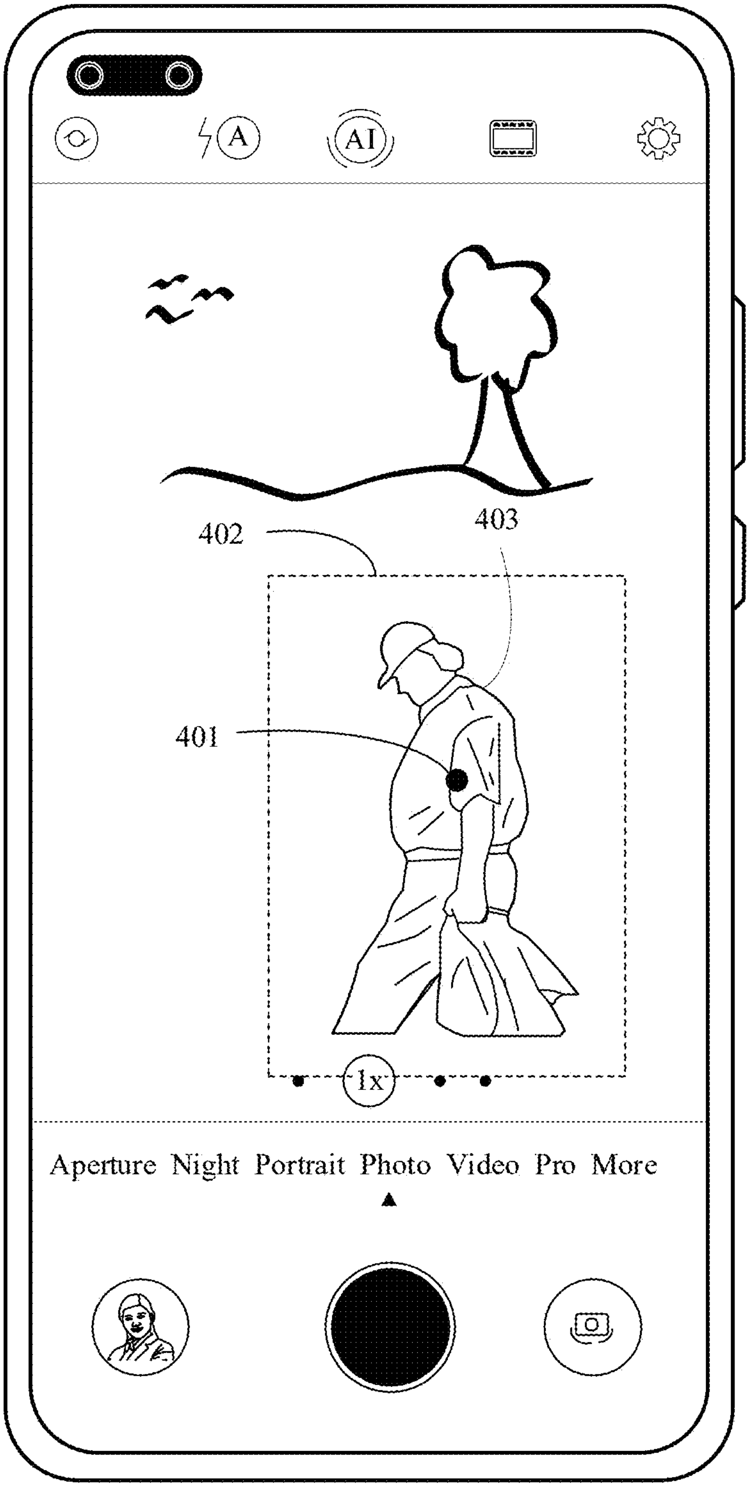
Figure 4C:
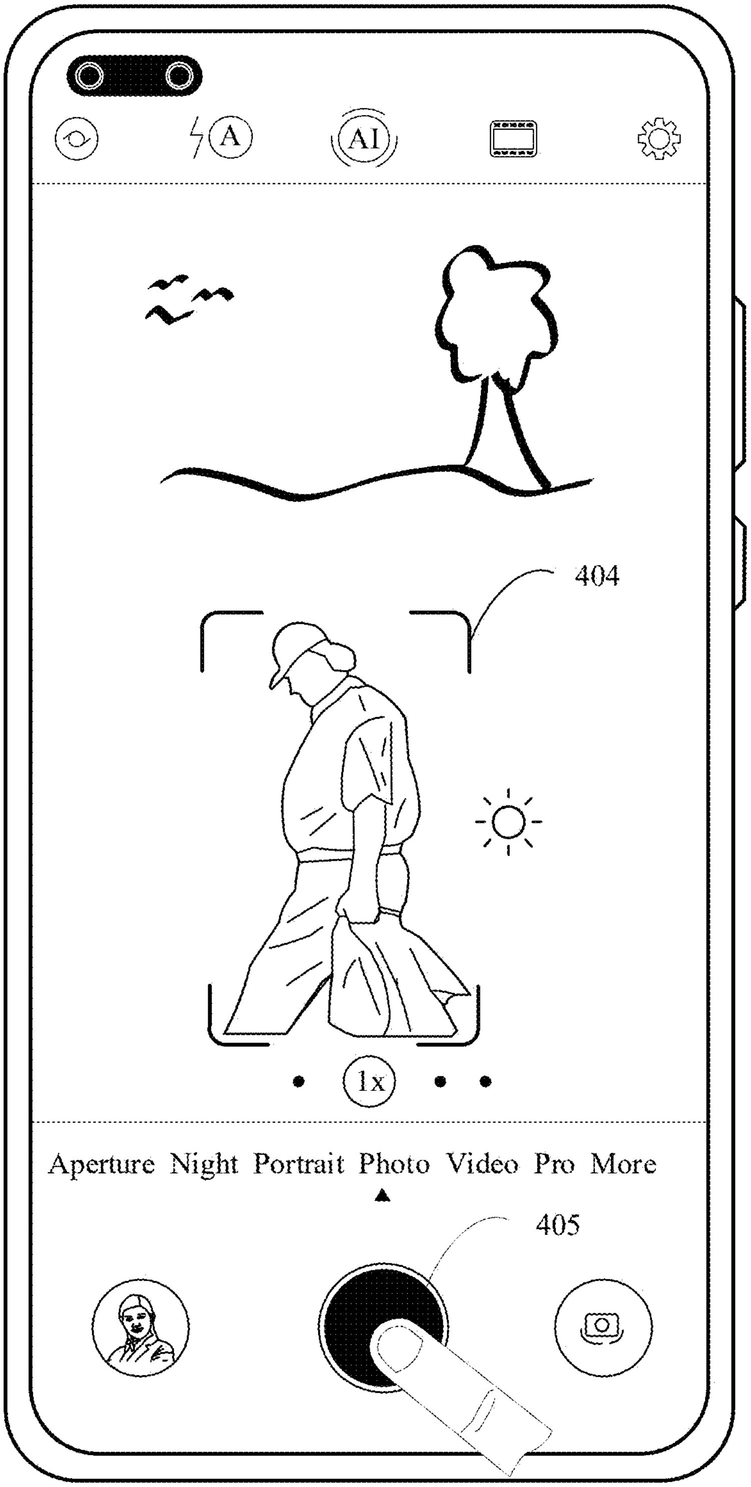
Figure 4D:
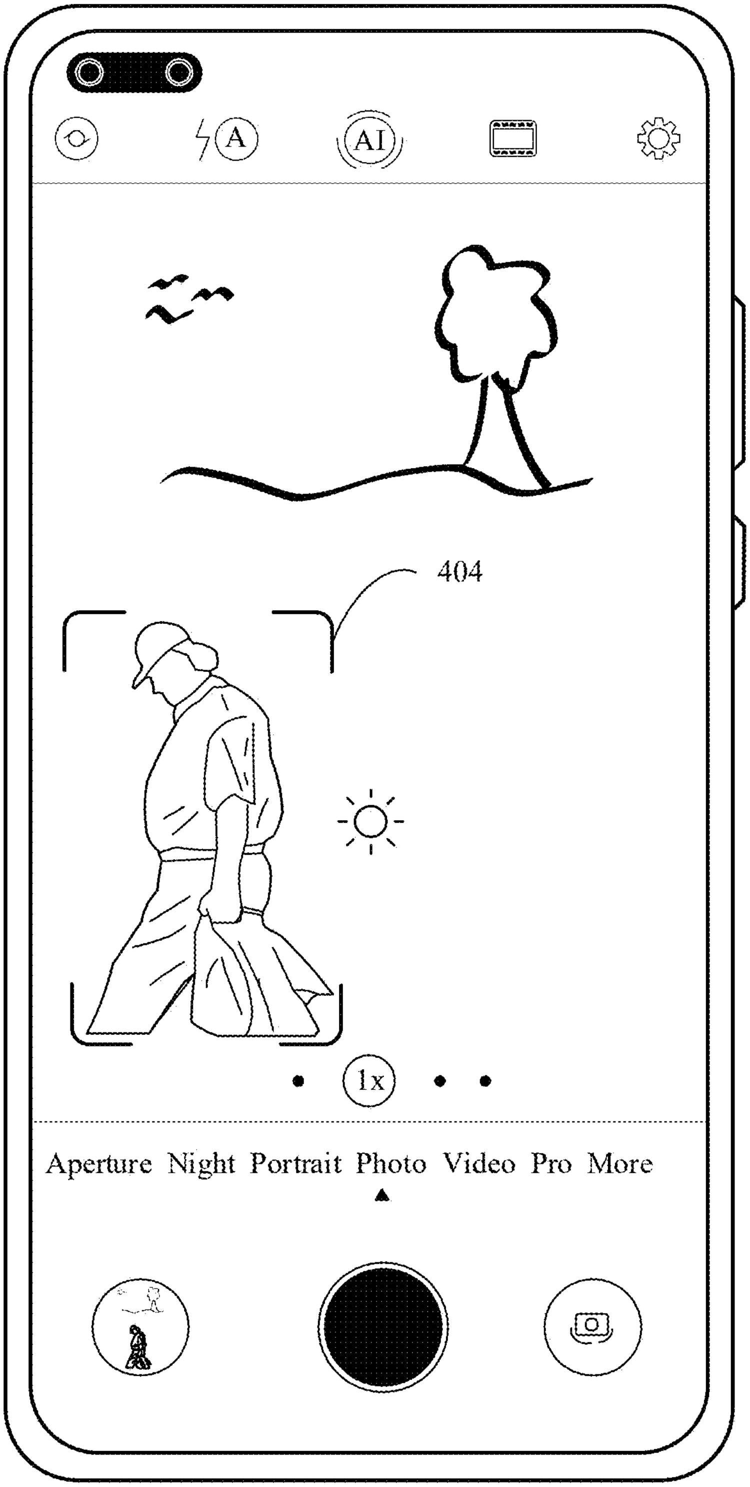
Figure 4E:
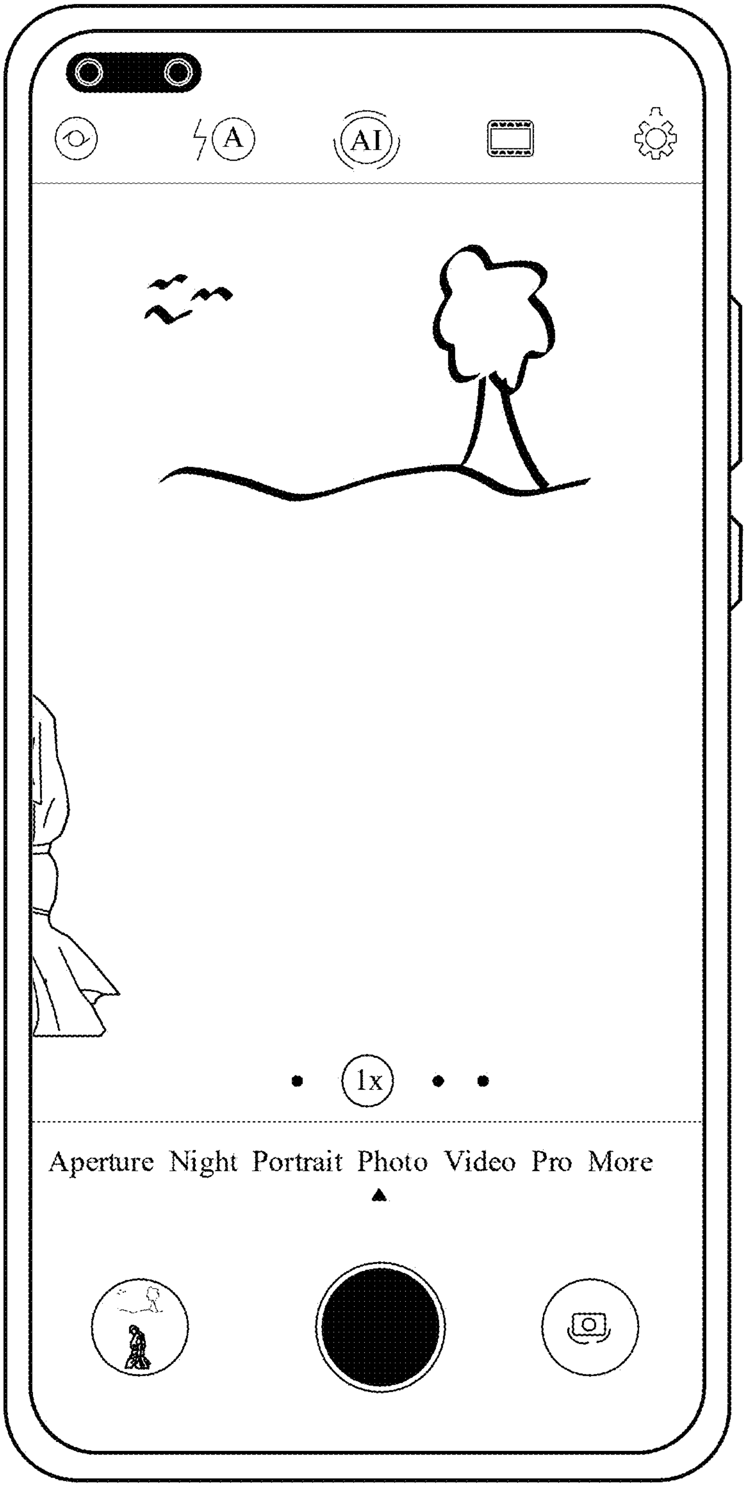
Figure 5A:
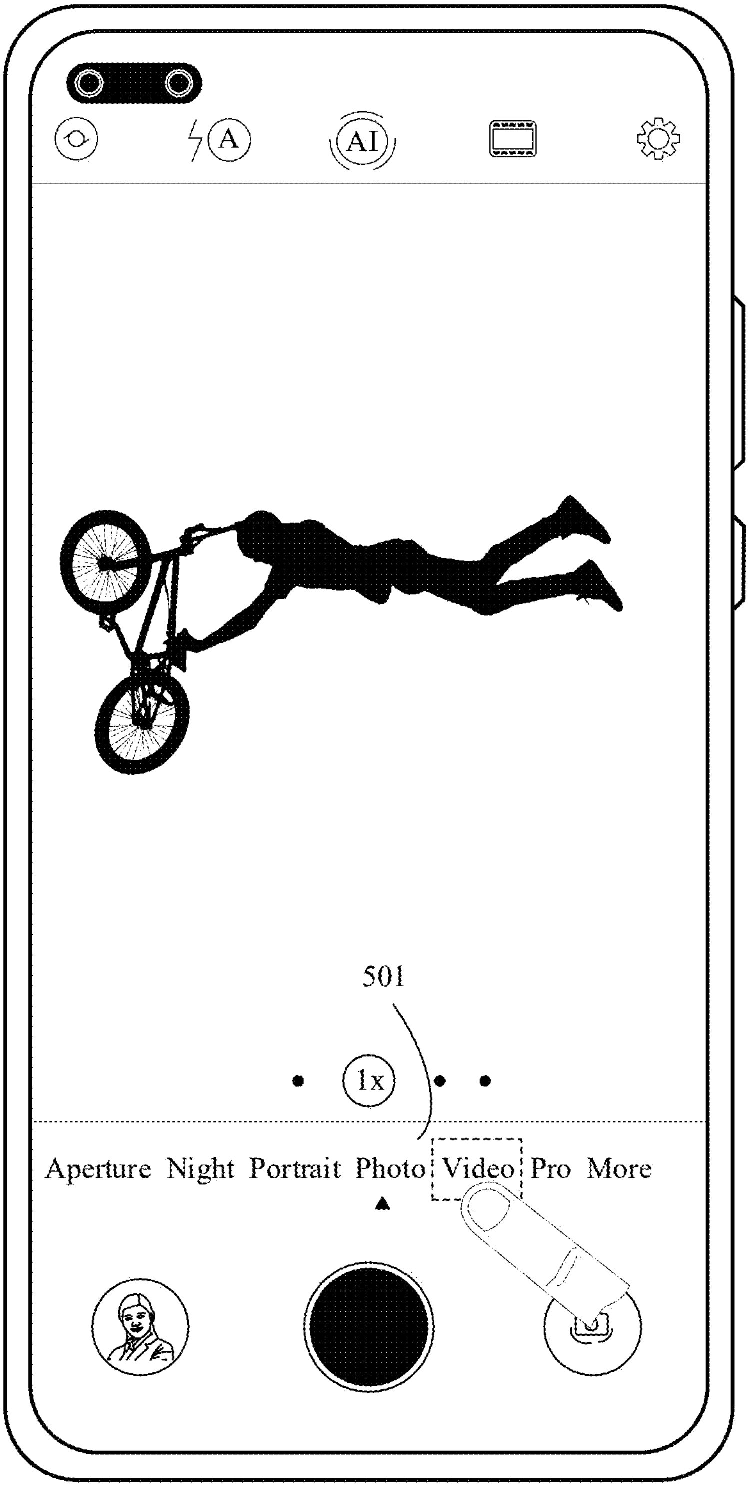
FIG. 5A to FIG. 5D are schematic diagrams of changes in an interface of target tracking in a video recording scenario according to an embodiment of this application.
Figure 5B:
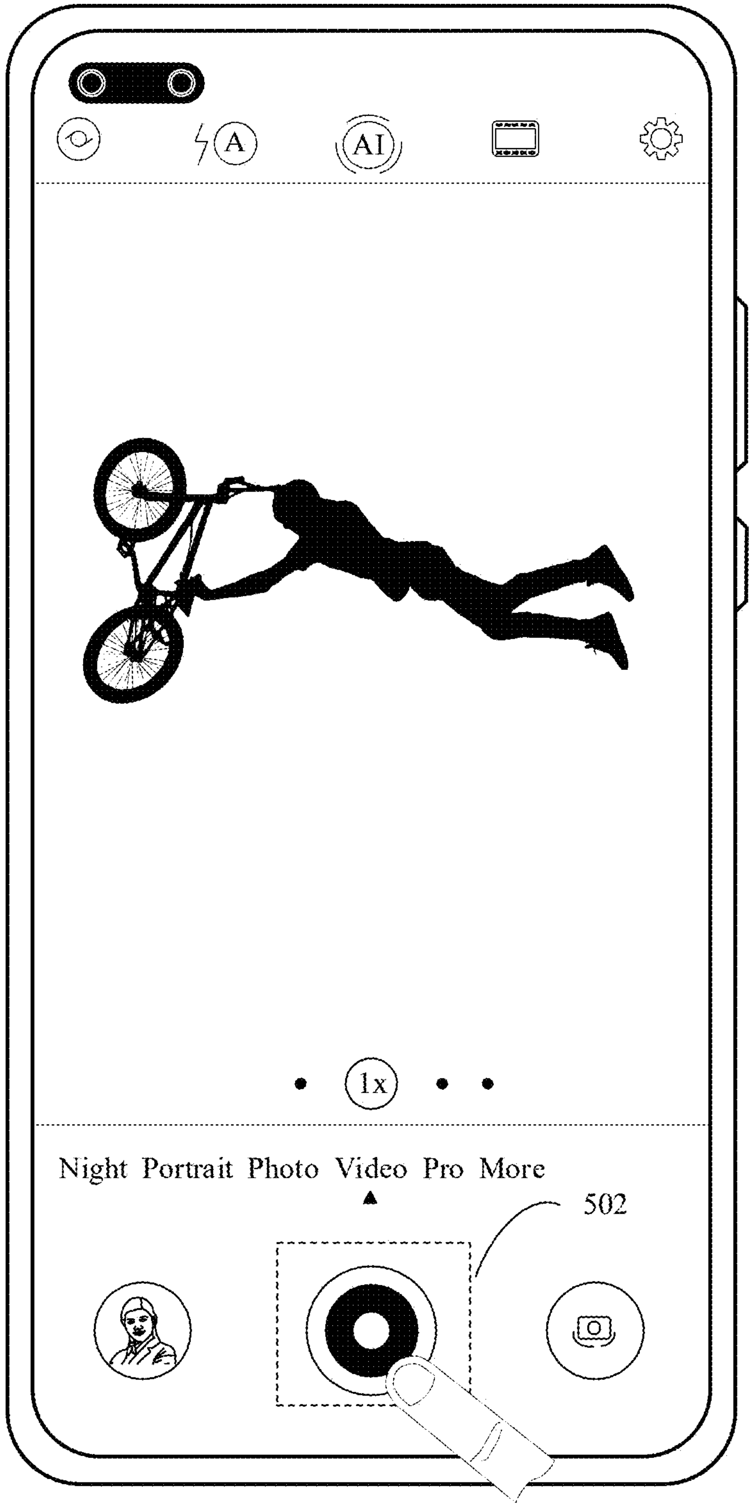
Figure 5C:
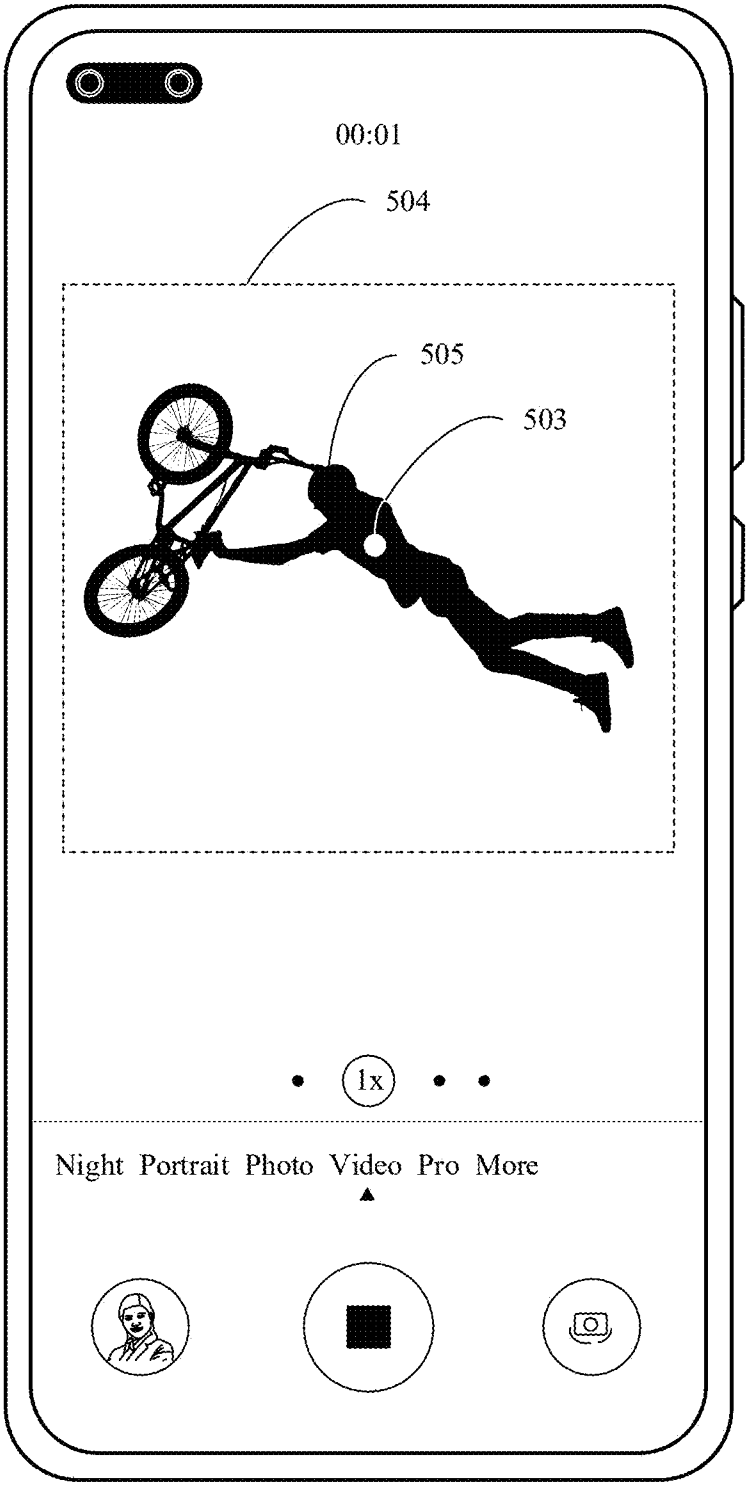
Figure 5D:
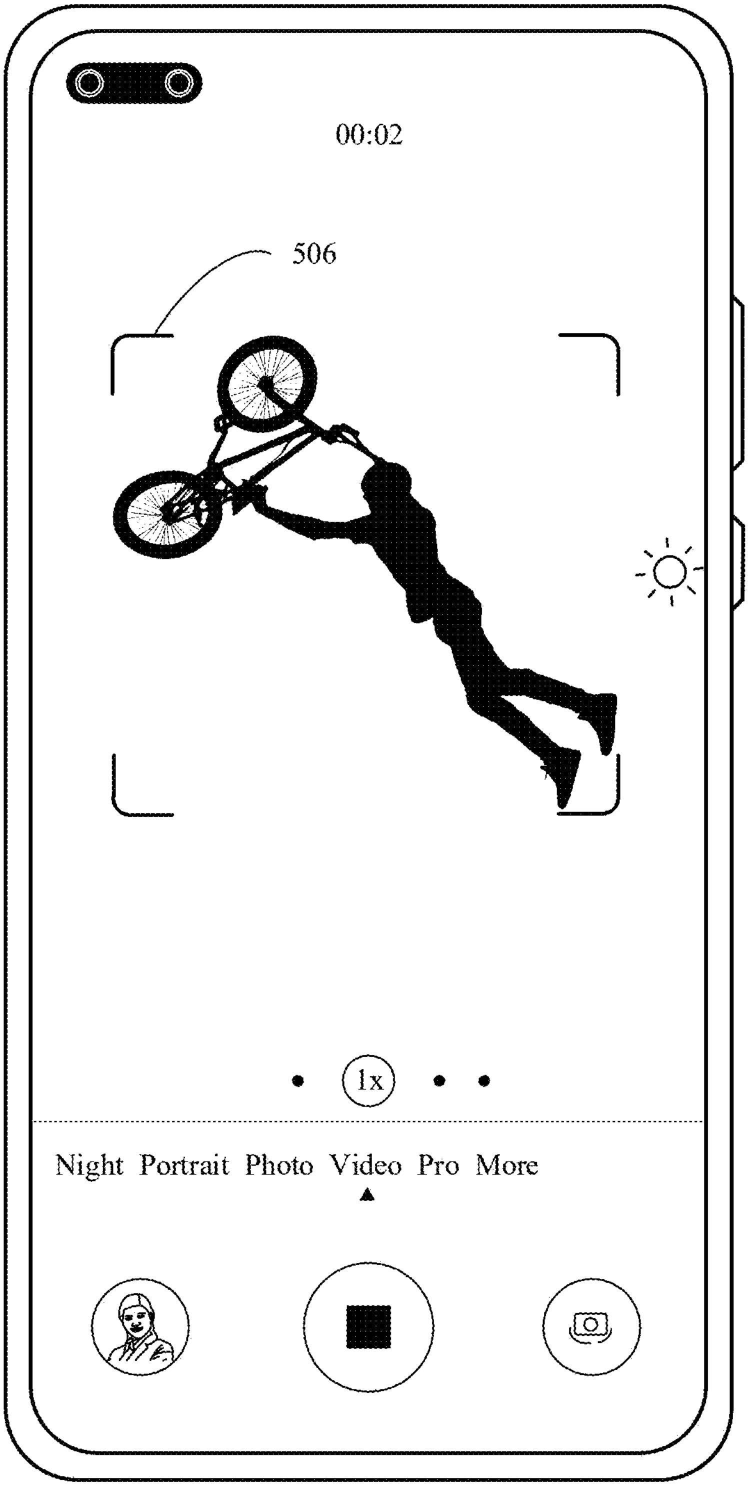
Figure 6A:
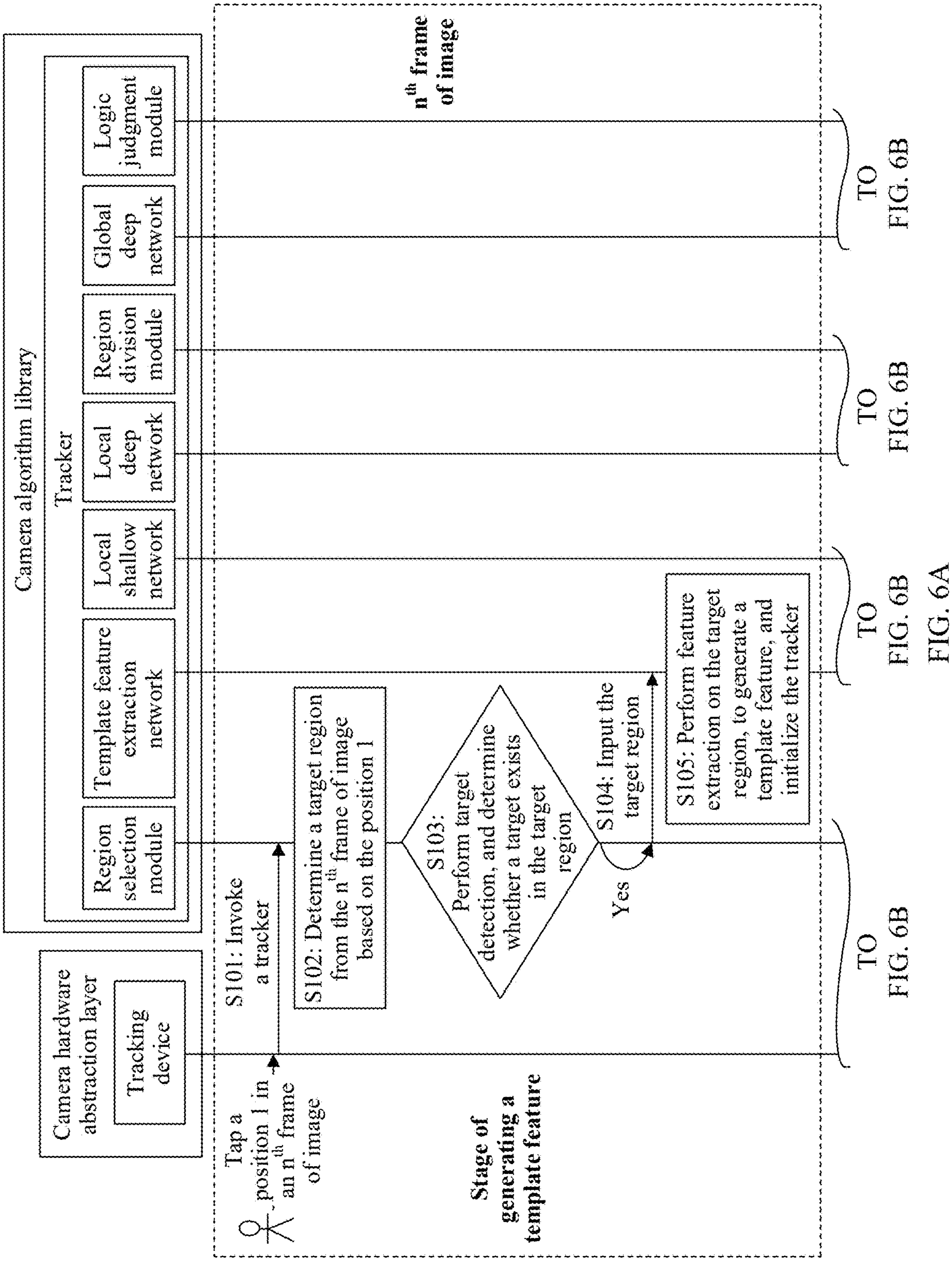
FIG. 6A to FIG. 6E are schematic flowcharts of a target tracking method according to an embodiment of this application.
Figure 6B:
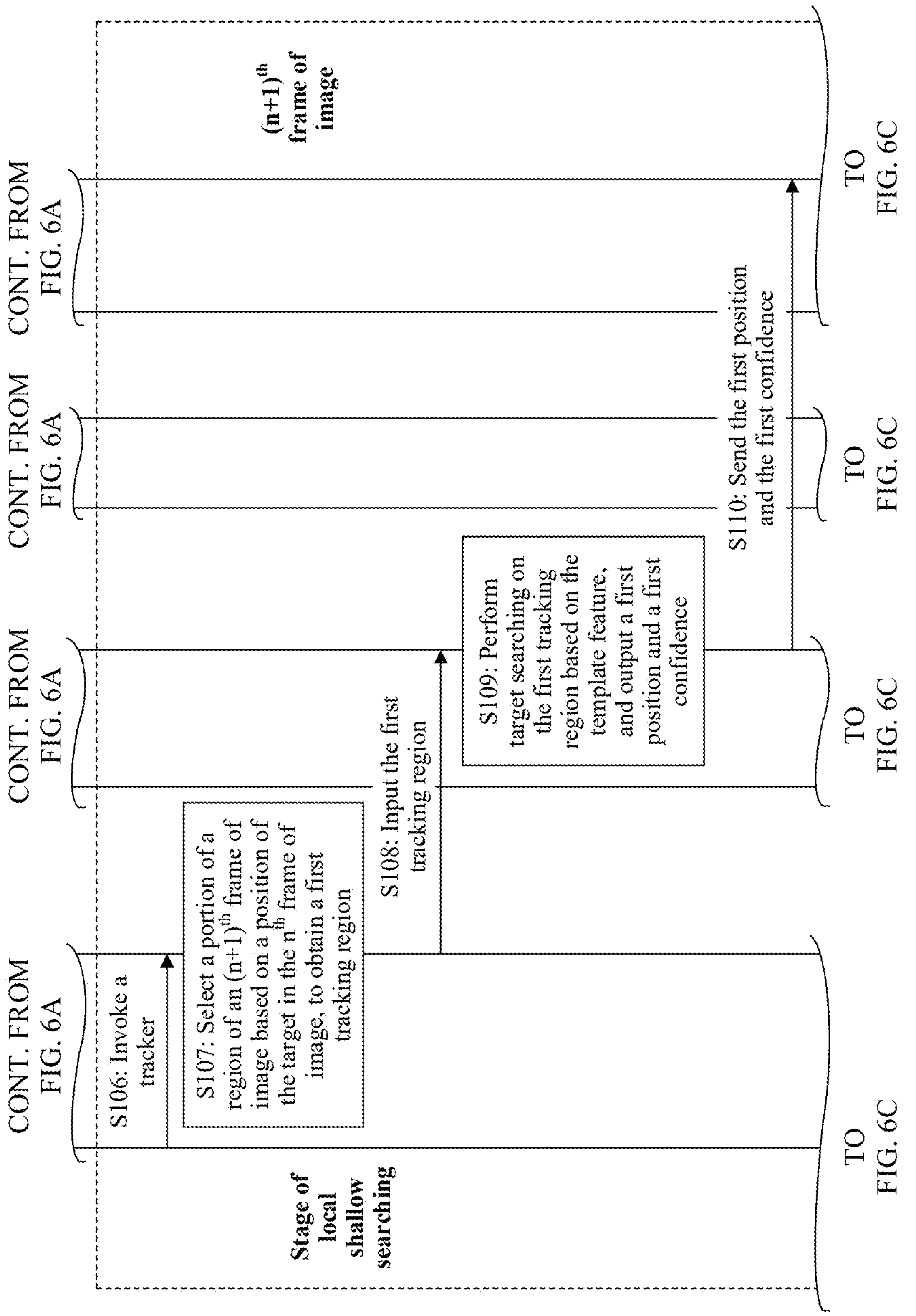
Figure 6C:
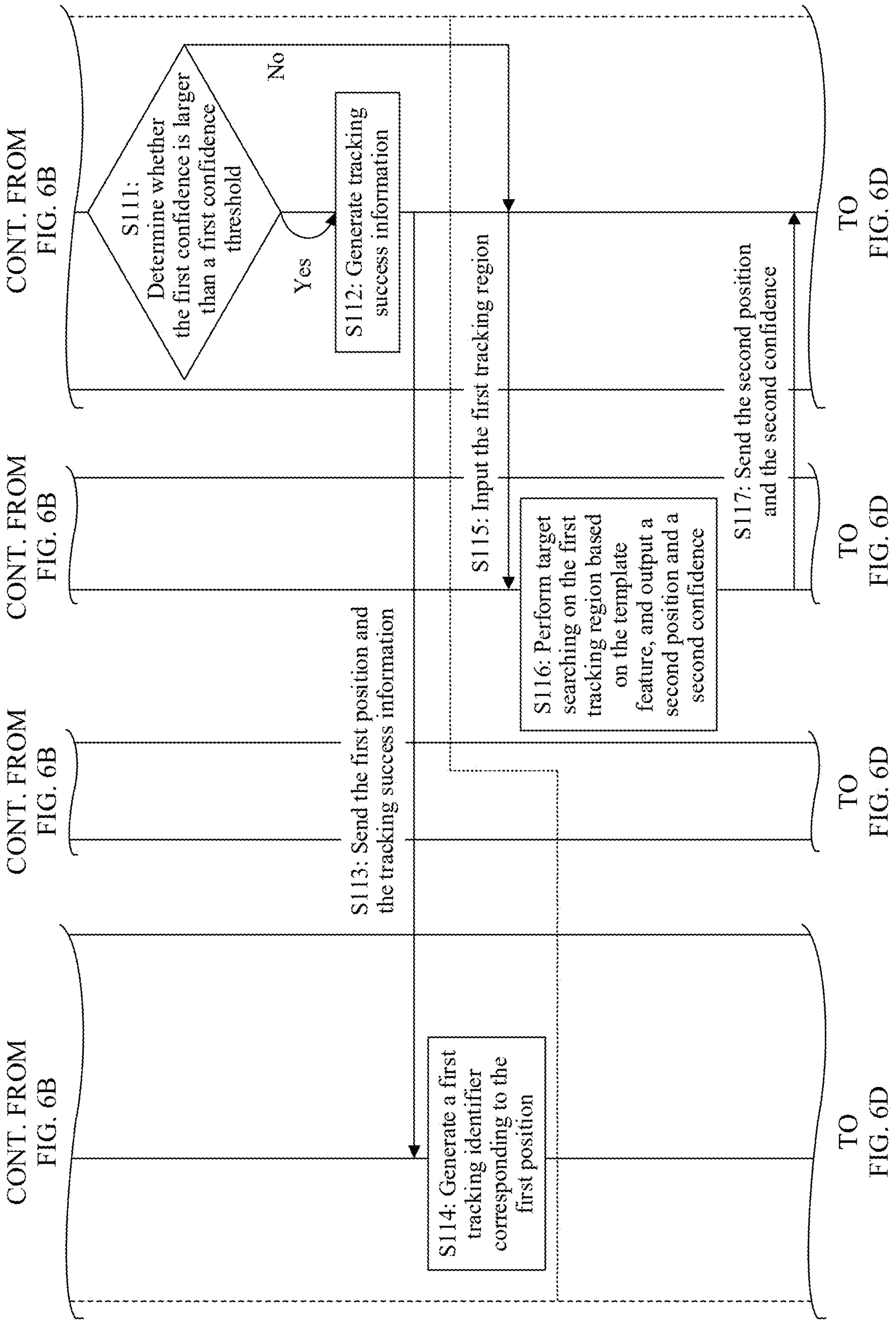
Figure 6D:
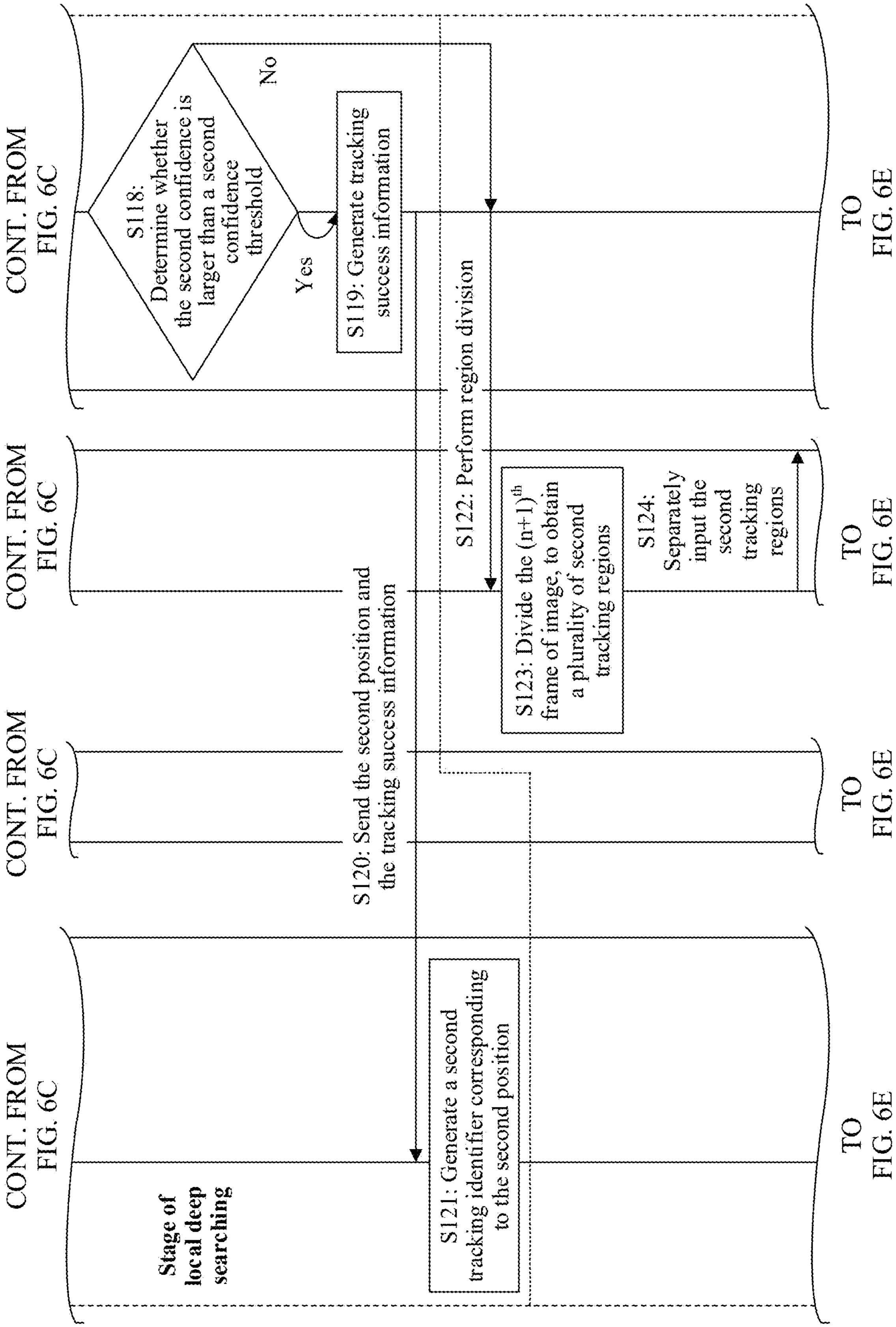
Figure 6E:
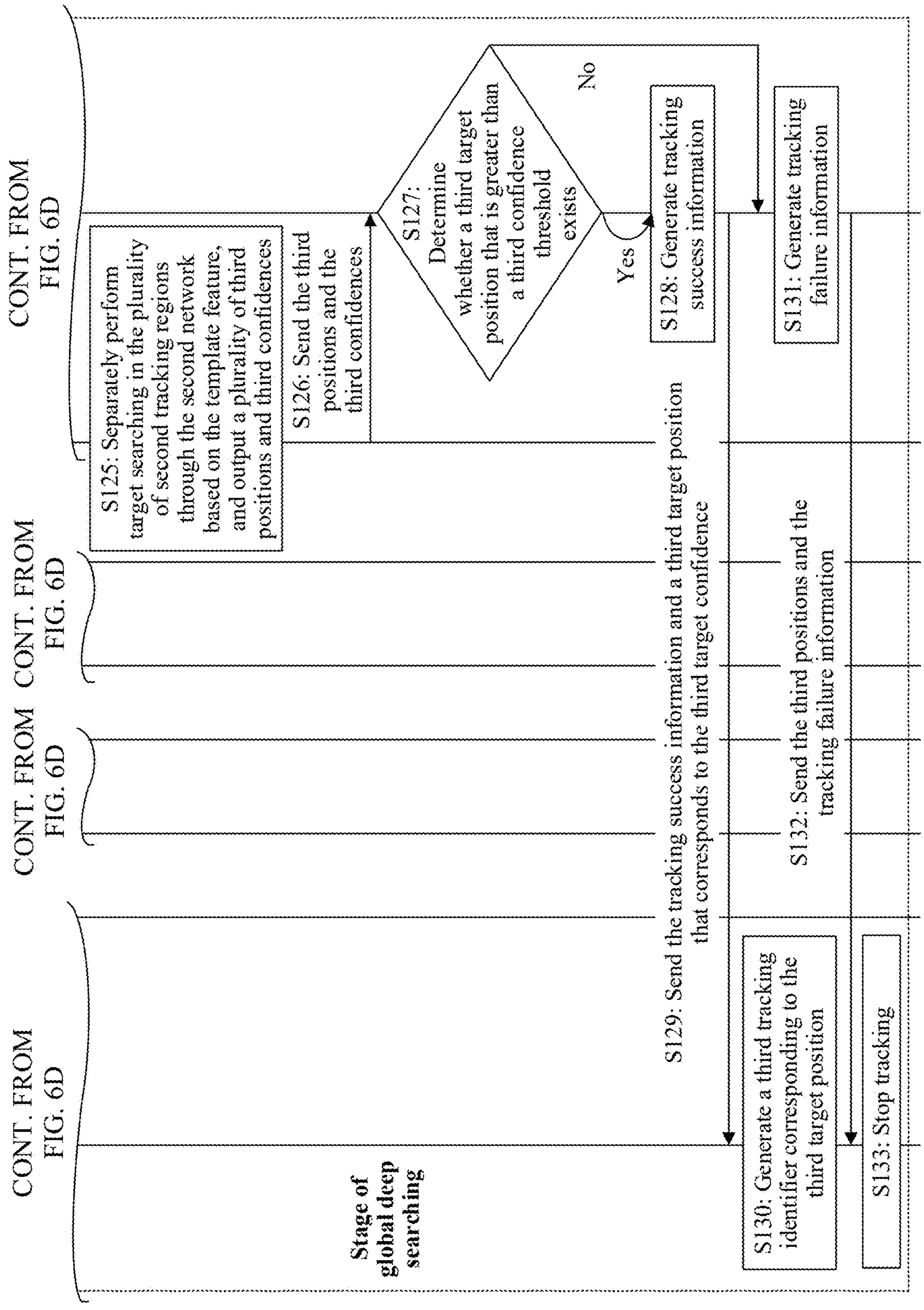

As shown in FIG. 3, the software system in the hierarchical architecture is divided into several layers, and each layer has a clear role and task. The layers communicate with each other through a software interface. In some embodiments, the software system may be divided into five layers that are respectively an application layer 210, an application framework layer 220, a hardware abstraction layer 230, a driver layer 240, and a hardware layer 250 from top to bottom.

The application layer 210 may include a camera and a gallery application, and may further include applications such as calendar, phone, map, navigation, WLAN, Bluetooth, music, video, and messages.

The application framework layer 220 provides an application access interface and a programming framework for the applications at the application layer 210.

For example, the application framework layer 220 includes a camera access interface. The camera access interface is configured to provide a camera photographing service through camera management and a camera device.

A camera manager at the application framework layer 220 is configured to manage the camera. The camera manager can obtain a parameter of the camera, for example, determine a working state of the camera.

The camera device at the application framework layer 220 is configured to provide a data access interface between a different camera device and the camera manager.

The hardware abstraction layer 230 is used for abstraction of hardware. For example, the hardware abstraction layer 230 may include a camera hardware abstraction layer and another hardware device abstraction layer. The camera hardware abstraction layer may include a camera device 1, a camera device 2, a tracking device, and the like. It may be understood that the camera device 1, the camera device 2, the tracking device, and the like may be functional modules implemented through software or a combination of software and hardware. When the electronic device is started, or in an operation process of the electronic device, a corresponding process is created or a corresponding procedure is started, to implement corresponding functions of the camera device 1, the camera device 2, and the tracking device. Specifically, the tracking device is used to implement a function target tracking.

The camera hardware abstraction layer may be connected to a camera algorithm library, and may invoke an algorithm in the camera algorithm library. In embodiments of this application, the camera algorithm library includes a tracker (that is, a tracking algorithm). Optionally, the tracker may be implemented through the following modules: a region selection module, a region division module, a template feature extraction network, a local shallow network, a local deep network, a global deep network, a logic judgment module, and the like.

It may be understood that, for image shooting preview, video recording preview, or video recording, the electronic device 100 is continuously acquiring and displaying a video stream. The video stream includes a plurality of frames of image. Therefore, in embodiments of this application, each image in the video stream is referred to as a frame of image, and an $n^{th}$ image in the video stream is referred to as an $n^{th}$ frame of image.

The region selection module is used to determine a target region in the $n^{th}$ frame of image in the video stream, and is further used to select a portion of a region of an $(n+x)^{th}$ frame of image based on a position of a target in an $(n+x-1)^{th}$ frame of image, to obtain a first tracking region, where n and x are positive integers. In other words, the region selection module determines a target region in the $n^{th}$ frame of image, and separately selects the first tracking region from frames of image after the $n^{th}$ frame of image. When a first tracking region is selected from a specific frame of image, the first tracking region is selected based on a position of a target in a last frame (or called a former frame) of image of the frame of image. Optionally, a resolution of the first tracking region is greater than a resolution of the target region.

The region division module divides the $(n+x)^{th}$ frame of image, to obtain a plurality of second tracking regions. Optionally, a resolution of the second tracking region is greater than the resolution of the first tracking region.

The template feature extraction network performs feature extraction on a target image, to obtain a template feature.

The local shallow network, the local deep network, and the global deep network are all used to perform target searching on a to-be-processed image that is input into the network (referred to as an input image) based on the template feature, and output a position of the target and a confidence that corresponds to the position. Optionally, the local shallow network, the local deep network, and the global deep network may be convolutional neural networks.

Specifically, during target tracking, the image input to the local shallow network and the local deep network is the first tracking region selected by the region selection module. That is, the local shallow network and the local deep network are used to perform searching on a local region. The image input to the global deep network is the second tracking region obtained by the region division module, that is, the global deep network is used to perform searching on a global region.

The resolution of the second tracking region may be greater than the resolution of the first tracking region, that is, a resolution of an input image of the global deep network is larger than a resolution of an input image of the local shallow network and a resolution of an input image of the local deep network. Optionally, at least one of network widths and network depths of the local deep network and the global deep network is greater than at least one of the network width and the network depth of the local shallow network.

The logic judgment module is used to performing logic judgment on confidences output by the local shallow network, the local deep network, and the global deep network, to determine a target tracking result. The target tracking result may include that tracking is successful and tracking fails (that is, tracking is lost).

Specifically, the logic judgment module is used to determine a first confidence output by the local shallow network. If the first confidence is greater than a first confidence threshold, it is determined that tracking is successful, and a first position output by the local shallow network is output as the position of the target. If the first confidence is less than or equal to a first confidence threshold, the first tracking region is input into the local deep network for processing.

The logic judgment module is further used to determine a second confidence output by the local deep layer network. If the second confidence is greater than a second confidence threshold, it is determined that tracking is successful, and a second position output by the local deep layer network is output as the position of the target. If the second confidence is less than or equal to a second confidence threshold, the logic judgment module indicates the region division module to perform region division on the image, and separately input second tracking regions that are obtained by dividing into the global deep network for processing.

The logic judgment module is further used to determine a third confidence output by the global deep network. If the third confidence is greater than a third confidence threshold, it is determined that tracking is successful, and a third position output by the global deep network is output as the position of the target. If the third confidence is less than or equal to the third confidence threshold, it is determined that tracking is lost, and tracking on the target is stopped.

Certainly, the camera algorithm library may further include other preset algorithms, such as a purple edge removal algorithm, a saturation adjustment algorithm, and the like. Details are not limited in embodiments of this application.

The driver layer 240 is used to provide drivers for different hardware devices. For example, the driver layer may include a camera driver, a digital signal processor driver, and a graphics processing unit driver.

The hardware layer 250 may include a sensor, an image signal processor, a digital signal processor, a graphics processor, and another hardware device. The sensor may include a sensor 1, a sensor 2, and the like, and may also include a time of flight (time of flight, TOF) sensor and a multi-spectral sensor.

The following describes a working flowchart of a software system of the electronic device 100 by using an example of a target tracking process in an image shooting preview scenario.

When a user performs a tap operation on an icon of a camera APP on the touch sensor 180K, the camera APP is woken up by the tap operation and enters an image shooting preview mode. The camera APP invokes each camera device at the camera hardware abstraction layer through the camera access interface. For example, the camera hardware abstraction layer determines that a current zoom multiple is less than a zoom multiple of 0.6. In this way, a wide-angle camera lens can be invoked by issuing an instruction to the camera device driver, and the camera algorithm library starts to load the algorithm in the camera algorithm library.

When the sensor of the hardware layer is invoked, for example, after the sensor 1 in the wide-angle camera lens is invoked to obtain the original image, the original image is transmitted to the image signal processing for preliminary processing such as registration. After processing, the original image is sent back to the camera hardware abstraction layer through the camera device, and then processed through the algorithms in the loaded camera algorithm library, to obtain a frame of image 1.

The camera hardware abstraction layer sends the obtained frame of image 1 back to the camera APP through the camera access interface for preview and display.

When the user performs a tap operation on a position 1 of the frame of image 1 on the touch sensor 180K, in response to the tap operation, the camera APP invokes the tracking device of the camera hardware abstraction layer through the camera access interface. The tracking device of the camera hardware abstraction layer invokes the tracker in the camera algorithm library. The tracker acquires a target image from the frame of image 1, and extracts a template feature.

The camera APP continues to acquire a next frame of image according to the foregoing process, to obtain a frame of image 2. The tracking device invokes the tracker in the camera algorithm library. The tracker performs target tracking on the frame of image 2 based on the template feature extracted from the frame of image 1, to obtain a position of the target in the frame of image 2. The tracking device of the camera hardware abstraction layer generates a tracking identifier corresponding to the position. The tracking identifier is used to identify the position of the target in the frame of image 2. Operation of the tracker in the camera algorithm library and another preset algorithm may be implemented by the digital signal processor driver invoking the digital signal processor and by the graphics processor driver invoking the graphics processor.

The camera hardware abstraction layer sends the obtained frame of image 2 and the tracking identifier back to the camera APP through the camera access interface. The camera APP previews and displays the frame of image 2 in an interface of the electronic device, and displays the tracking identifier. In this way, the tracking identifier may be presented at a periphery of the target in the interface, prompting the user that a current target is located within a region defined by the tracking identifier. In a specific embodiment, the tracking identifier is used to define a square region. Optionally, the tracking identifier defines a complete square region continuously, that is, the tracking identifier is a tracking frame. Optionally, the tracking identifier may define the square region through only four corners. A specific form of the tracking identifier is not limited in this embodiment of this application.

Based on a generation process of the frame of image 2, target tracking on each frame of image may be implemented through repetitive execution.

For ease of understanding, in the following embodiments of this application, for example, the electronic device having the structures in FIG. 2 and FIG. 3 is used in combination with the accompanying drawings and application scenarios to specifically illustrate the target tracking method provided in embodiments of this application.

Firstly, an interface of the target tracking method is illustrated by using an example of a preview scenario and a video recording scenario of a mobile phone.

For example, FIG. 4A to FIG. 4E are schematic diagrams of changes in an interface of target tracking in an image shooting preview scenario according to an embodiment of this application. As shown in (a) in FIG. 4A to FIG. 4E, when the user taps on the icon of the camera APP on a home screen of the mobile phone, the mobile phone opens the camera APP, enters an image shooting preview interface, and displays a preview image of a surrounding environment as shown in (b) in FIG. 4A to FIG. 4E. In the preview interface, if the user taps on a position 401 of a preview image on a screen, in response to the tap of the user, the camera APP determines a target region 402 based on the position 401 tapped by the user through the target tracking method provided in this embodiment of this application. The target region 402 includes a to-be-tracked target 403. Subsequently, after the preview image is acquired, the target 403 in the preview image is tracked, and a tracking identifier is displayed. For example, as shown in (c) in FIG. 4A to FIG. 4E, when the target 403 moves, or the user moves the mobile phone (an example in which the target 403 moves in FIG. 4A to FIG. 4E is used), the position of the target 403 on the screen changes, the target 403 is tracked through the method provided in this embodiment of this application, and the tracking identifier 404 is displayed in the interface.

Optionally, when the user taps an image shooting control 405 in an image shooting preview interface, the camera APP saves an image to an album. Then, through the target tracking method provided in this embodiment of this application, the target 403 is tracked, and the tracking identifier 404 is displayed as shown in (d) in FIG. 4A to FIG. 4E.

In an embodiment, when the target 403 partially or completely moves outside the screen, tracking is lost, and the tracking identifier is not displayed in the interface as shown in (e) in FIG. 4A to FIG. 4E. Optionally, after tracking is lost, when the target 403 appears on the screen again, the target 403 may be continuously tracked, or the target 403 may not be tracked. This is not limited in this embodiment of this application. In another embodiment, when the user switches an image shooting mode, for example, switches the image shooting mode to a video shooting mode, a portrait mode, and the like, the camera APP restarts a flow and does not track the target 402.

A video recording preview scenario is similar to an image shooting preview process shown in FIG. 4A to FIG. 4E. Details are not described herein.

For example, FIG. 5A to FIG. 5D are schematic diagrams of changes in an interface of target tracking in a video recording preview scenario according to an embodiment of this application. As shown in (a) in FIG. 5A to FIG. 5D, in an image shooting preview interface, a user taps on a "video recording" control 501, and a camera APP switches an image shooting mode to a video recording mode. A mobile phone displays a video recording preview interface shown in (b) in FIG. 5A to FIG. 5D. A preview image of a surrounding environment is displayed in the interface. When the user taps on a recording start control 502 in the video preview interface, the camera APP starts recording a video and enters an interface shown in (c) in FIG. 5A to FIG. 5D. In a video recording process, if the user taps on a position 503 on a screen, in response to the tap of the user, the camera APP determines a target region 504 based on the position 503 tapped by the user through the target tracking method provided in this embodiment of this application. The target region 504 includes a to-be-tracked target 505. Subsequently, after a frame of image is acquired, the target 505 in the preview image is tracked, and a tracking identifier is displayed. For example, as shown in (d) in FIG. 5A to FIG. 5D, when the target 505 moves, or the user moves the mobile phone (an example in which the target 505 moves in FIG. 5A to FIG. 5D is used), the position of the target 505 on the screen changes, the target 505 is tracked through the method provided in this embodiment of this application, and the tracking identifier 506 is displayed in the interface.

Optionally, in the video recording scenario, when the user taps a recording stop control, or when a tracked target is lost, the target 505 is not tracked.

The following uses an example of a preview scenario and a video recording scenario of a mobile phone to describe a specific process of implementing tracking effect through the target tracking method.

This embodiment mainly explains a process in which a camera hardware abstraction layer and a camera algorithm library process an image during target tracking. For a generation process of the image, refer to the foregoing embodiment. Details are not described herein.

Figure 7:
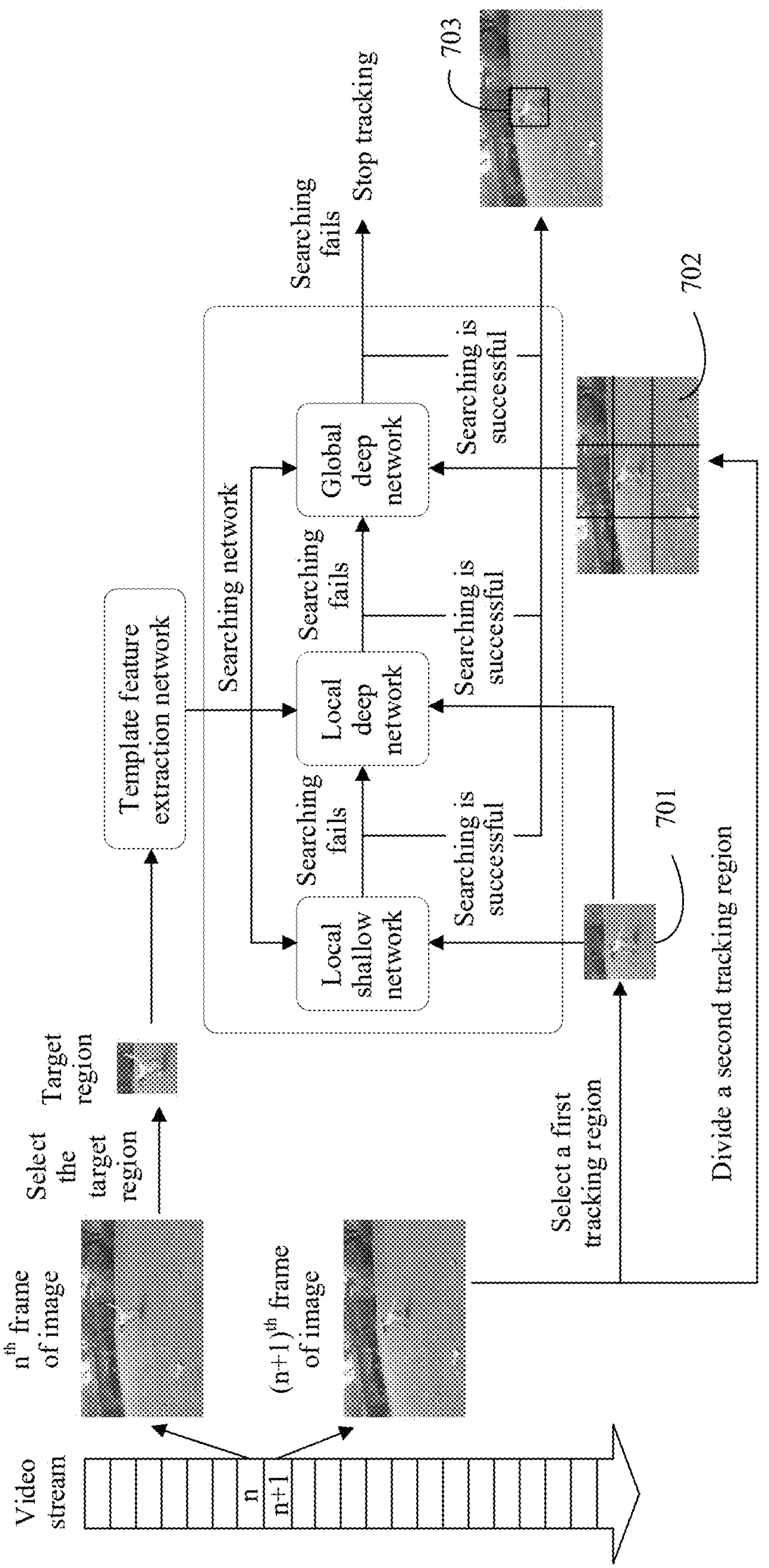
FIG. 7 is a schematic diagram of a principle of a target tracking method according to an embodiment of this application.

For example, FIG. 6A to FIG. 6E are schematic flowcharts of a target tracking method according to an embodiment of this application. FIG. 7 is a schematic diagram of a principle of a target tracking method according to an embodiment of this application. As shown in FIG. 6A to FIG. 6E and FIG. 7, the method includes step S101 to step S133.

Step S101 to step S105 show a process of extracting a feature and generating a template feature, referred to as a stage of generating the template feature. Step S106 to step S114 show a target tracking process through a local shallow network, referred to as a stage of performing local shallow searching. Step S115 to step S121 show a target searching process through a local deep network, referred to as a stage of performing local deep searching. Step S122 to step S133 show a target searching process through a global deep network, referred to as a stage of performing local deep searching. Description is performed in sequence in stages.

1. Stage of Generating a Template Feature

S101: Display an $n^{th}$ frame of image of a video stream in an interface of a mobile phone. In response to a tap operation performed on a position 1 in the $n^{th}$ frame of image by a user, a tracking device in a camera hardware abstraction layer invokes a tracker in a camera algorithm library.

Optionally, when invoking the tracker, the tracking device may carry the $n^{th}$ frame of image, information about the position 1, and the like.

S102: In response to invoking of the camera tracking device, a region selection module in the tracker determines a target region in the $n^{th}$ frame of image based on the position 1.

In this embodiment, the $n^{th}$ frame of image is any frame of image in the video stream, where n is a positive integer. The $n^{th}$ frame of image is a frame of image that triggers a target tracking process, the basis for subsequent target tracking. Therefore, the $n^{th}$ frame of image is also referred to as an initial frame. After the initial frame in the video stream, a frame of image on which target tracking is performed based on the initial frame may be referred to as a tracking frame.

Optionally, the position 1 may be, for example, the position 401 in (b) in FIG. 4A to FIG. 4E or the position 503 in (b) in FIG. 5A to FIG. 5D.

In a specific embodiment, the region selection module may select a region within a preset range 1 centered on the position 1, and determine the region as a target region. For example, centered on the position 1, a circular region is selected based on a preset radius, and determined as the target region. Alternatively, centered on the position 1, a square region is selected based on a preset area, and determined as the target region. As shown in FIG. 7, in a specific embodiment, the target region may be shown in FIG. 7.

It should be noted that in this embodiment, step S101 and step S102 are performed by triggering the tap operation performed on the position 1 by the user. In some other embodiments, in different application scenarios, step S101 and S102 may alternatively be triggered in another manner, for example, triggered by performing target detection. Face recognition is used as an example. When an electronic device detects a face in the $n^{th}$ frame of image, the tracking device invokes the tracker to perform target tracking. In this case, "determines a target region in the $n^{th}$ frame of image based on the position 1" in step S102 may alternatively be replaced with "determines a target region in the $n^{th}$ frame of image based on a position of a detected center point of a target". Specifically, the region selection module may calculate a position at which the detected center point of the target is located, and centered on the center point, a region within the surrounding preset range 1 is selected and determined as the target region. In addition, in this case, step S103 may not be performed, and step S104 may be directly performed.

S103: The region selection module performs target detection on the target region, to determine whether a target exists in the target region. If a target exists in the target region, step S104 is performed. If no target exists in the target region, the process ends.

Optionally, a method for performing target detection by the region selection module may include: detecting an edge feature in the target region according to an edge detection algorithm, and determining, based on the edge feature, whether a target exists in the target region.

Optionally, a target feature extraction network may also determine, according to a saliency target detection algorithm, whether a target exists in the target region. For example, through a multi-level feature aggregation network, saliency target detection is performed by using convolutional features at a plurality of levels as saliency cues.

If the region division module determines, by performing target detection, some or all of objects such as people, animals, plants, articles, and the like exist in the target region, it is determined that a target exists in the target region, and step S104 is performed. For example, if a cup, a cat, a flower, a people, a hand of a people, and the like exist in the target region, it is determined that a target exists in the target region. If any one of the targets above does not exist in the target region, it is determined that no target exists in the target region, and target tracking is abandoned. For example, if the target region includes an intermediate region including only a carpet without patterns or repeated patterns, it is determined that no target exists in the target region.

In a specific embodiment, in a target region shown in FIG. 7, after target detection is performed in this step, it is determined that a target (a dog) exists in the target region, and step S104 is continuously performed.

It may be understood that when the target region does not include the target, it is of little significance in performing target tracking. Even if target tracking is performed, tracking is lost quickly. Therefore, in this step, for the target region in which no target exists, target tracking is directly abandoned, to simplify the algorithm, improve operation efficiency of the algorithm, and improve user experience.

It should be noted that step S103 is an optional step, and may not be performed. That is, step S104 is directly performed after step S102 is performed.

S104: The region selection module inputs the target region into a template feature extraction network.

S105: The template feature extraction network performs feature extraction on the target region, to generate a template feature, and initializes the tracker.

Optionally, the template feature extraction network initializes the tracker may include: setting a state of the tracker to a tracking state, and the like. The tracking state represents that the target tracking process has been initiated. It may be understood that modules in the tracker may perform related operations based on the state of the tracker. When invoking of the tracking device is received, if it is determined that the state of the tracker is the tracking state, the related modules in the tracker perform target tracking based on the template feature.

It is understood that while step S101 to step S105 are performed, the electronic device may acquire a next frame of image of the video stream, that is, an $(n+1)^{th}$ frame of image, based on the process described in the foregoing embodiment. Because a short time is required to perform step S101 to step S105, before the electronic device acquires the $(n+1)^{th}$ frame of image, or while the electronic device acquires the $(n+1)^{th}$ frame of image, step S101 to step S105 may be performed. Therefore, the target may be tracked from the $(n+1)^{th}$ frame of image based on the template feature obtained in step S105. This embodiment is illustrated by using an example in which the target is tracked from $(n+1)^{th}$ frame of image after step S105.

However, in other embodiments, after step S105, the target may alternatively be tracked from another frame. For example, the target may be tracked from an $(n+2)^{th}$ frame of image, an $(n+5)^{th}$ frame of image, and the like. Optionally, when a long time is required to perform step S101 to step S105, or a long time is required to generate the template feature because the method further includes another step other than step S101 to step S105, the target may alternatively be tracked from a frame of image whose generation time is closest to a current moment after the template feature is generated. This is not limited in this embodiment of this application.

2. Stage of Local Shallow Searching

S106: After acquiring the $(n+1)^{th}$ frame of image (the tracking frame), the tracking device at the camera hardware abstraction layer invokes the tracker in the camera algorithm library.

Optionally, when invoking the tracker, the tracking device may carry the $(n+1)^{th}$ frame of image.

As shown in FIG. 7, in a specific embodiment, the $(n+1)^{th}$ frame of image may be shown in FIG. 7.

S107: In response to invoking of the camera tracking device, the region selection module in the tracker selects a portion of a region of the $(n+1)^{th}$ frame of image based on a position of the target in the $n^{th}$ frame of image, to obtain a first tracking region.

As described above, the template feature extraction network sets the state of the tracker to the tracking state after generating the template feature. Therefore, in this embodiment, when invoking of the camera tracking device is received, the region selection module determines that the state of the tracker is the tracking state, and selects the first tracking region from the $(n+1)^{th}$ frame of image.

Optionally, the region selection module may select the first tracking region based on the position of the center point of the target in the $n^{th}$ frame of image. Specifically, the region selection module may, in the $(n+1)^{th}$ frame of image, select the position of the center point of the target in the $n^{th}$ frame of image as a center, and select a first tracking region from a region within a preset range 2. An area of the first tracking region is smaller than an area of the $(n+1)^{th}$ frame of image, that is, the first tracking region is a local region in the $(n+1)^{th}$ frame of image.

Optionally, the preset range 2 may be larger than the preset range 1, to enable the area of the first tracking region to be larger than the area of the target region, that is, a resolution of the first tracking region may be larger than a resolution of the target region. If the resolution of the first tracking region is greater than the resolution of the target region, when searching is subsequently performed in the first tracking region, probability that searching is successful is larger. Therefore, the success rate of target tracking is higher.

Certainly, the region selection module may alternatively select the first tracking region based on a position of an edge, a top point, or the like of the target in the $n^{th}$ frame of image. This is not limited in this embodiment of this application.

S108: The region selection module inputs the first tracking region into the local shallow network.

S109: The local shallow network performs target searching on the first tracking region based on the template feature, and outputs a first position and a first confidence that corresponds to the first position, where the first position represents the position of the target in the $(n+1)^{th}$ frame of image.

S110: The local shallow network sends the first position and the first confidence to a logic judgment module.

S111: The logic judgment module determines whether the first confidence is larger than the first confidence threshold. If the first confidence is larger than the first confidence threshold, step S112 is performed. If the first confidence is not larger than the first confidence threshold, step S115 is performed.

That the first confidence is greater than the first confidence threshold indicates that target tracking performed through the local shallow network is successful, that is, tracking is successful, and step S112 is performed, to output the first position. That the first confidence is less than or equal to the first confidence threshold indicates that target tracking performed through the local shallow network fails, and step S115 is performed, to enter the stage of local deep searching.

S112: The logic judgment module generates tracking success information. The tracking success information represents that target tracking is successful.

S113: The logic judgment module returns the first position and the tracking success information to the tracking device at the camera hardware abstraction layer.

S114: After receiving the tracking success information, the tracking device generates, based on the first position, a first tracking identifier corresponding to the first position.

Then, the $(n+1)^{th}$ frame of image and the first tracking identifier are displayed in an interface of the electronic device.

3. Stage of Local Deep Searching

S115: The logic judgment module inputs the first tracking region into a local deep layer network.

S116: The local deep layer network performs target searching on the first tracking region based on the template feature, and outputs a second position and a second confidence that corresponds to the second position, where the second position represents the position of the target in the $(n+1)^{th}$ frame of image.

As shown in FIG. 7, in a specific embodiment, the first tracking region may be 701 in the figure. It may be seen that inputs to the local shallow network and the local deep network are a portion of the $(n+1)^{th}$ frame of image, that is, local searching is performed on the $(n+1)^{th}$ frame of image through the local shallow network and the local deep network.

S117: The local deep network sends the second position and the second confidence to the logic judgment module.

S118: The logic judgment module determines whether the second confidence is larger than a second confidence threshold. If the second confidence is larger than the second confidence threshold, step S119 is performed. If the second confidence is not larger than the second confidence threshold, step S122 is performed.

Optionally, the second confidence threshold and the first confidence threshold may be the same or not the same.

That the second confidence is larger than the second confidence threshold indicates that target searching performed through the local deep network is successful, that is, tracking is successful, and step S119 is performed, to output the second position. That the second confidence is less than or equal to the second confidence threshold indicates that target searching performed through the local deep network fails, and step S122 is performed, to enter the stage of global deep searching.

S119: The logic judgment module generates the tracking success information, where the tracking success information represents that target tracking is successful.

S120: The logic judgment module returns the second position and the tracking success information to the tracking device at the camera hardware abstraction layer.

S121: After receiving the tracking success information, the tracking device generates, based on the second position, a second tracking identifier corresponding to the second position.

Then, the $(n+1)^{th}$ frame of image and the second tracking identifier are displayed in the interface of the electronic device.

4. Stage of Global Deep Searching

S122: The logic judgment module indicates a region division module to perform region division.

S123: The region division module divides the $(n+1)^{th}$ frame of image, to obtain a plurality of second tracking regions.

Optionally, the region division module may divide the $(n+1)^{th}$ frame of image based on a preset division manner. For example, the $(n+1)^{th}$ frame of image may be divided into a plurality of second tracking regions based on a grid division manner. The method is simple and convenient, and can improve the operation efficiency of the algorithm.

Optionally, the region division module may alternatively divide the $(n+1)^{th}$ frame of image based on a feature of the $(n+1)^{th}$ frame of image. For example, based on a pixel point clustering method, a region proposal network (region proposal network, RPN) method, or the like, the $(n+1)^{th}$ frame of image is divided by fully considering the feature of the image, to generate the plurality of second tracking regions. This can improve integrity of the target in the second tracking region, and improve target tracking accuracy.

Optionally, an area of the second tracking region may be larger than an area of the first tracking region, that is, a resolution of the second tracking region is larger than a resolution of the first tracking region. Therefore, when global deep searching is performed based on the second tracking region, the probability that searching is successful is larger. Therefore, the success rate of target tracking is higher.

S124: The region division module separately inputs the second tracking regions into the global deep network.

S125: The global deep network separately performs target searching on each second tracking region based on the template feature, and separately outputs a plurality of third positions and third confidences that correspond to the third positions, where the third positions represent the position of the target in the $(n+1)^{th}$ frame of image.

As shown in FIG. 7, in a specific embodiment, the plurality of second tracking regions obtained after the $(n+1)^{th}$ frame of image is divided may be shown as 702 in FIG. 7. It may be learned that a deep tracking network separately searches each second tracking region 702, that is, the deep tracking network performs global searching on the $(n+1)^{th}$ frame of image.

S126: The global deep network sends the third positions and the third confidences to the logic judgment module.

S127: The logic judgment module determines whether a third target confidence that is larger than a third confidence threshold exists in the third confidence. If the third target confidence that is larger than the third confidence threshold exists in the third confidence, step S128 is performed. If a third target confidence that is larger than the third confidence threshold does not exist in the third confidence, step S131 is performed.

Optionally, the third confidence threshold may be the same or not the same as the first confidence threshold and the second confidence threshold.

That the third target confidence exists indicates that target searching performed through the global deep network is successful, that is, tracking is successful, and step S128 is performed, to output a third target position corresponding to the third target confidence. If no third target confidence exists, that is, all third confidences are less than or equal to the third confidence threshold, it indicates that target searching performed through the global deep network fails, that is, tracking fails, and step S122 is performed, to stop tracking.

S128: The logic judgment module generates the tracking success information, where the tracking success information represents that target tracking is successful.

S129: The logic judgment module returns the third target position and the tracking success information to the tracking device at the camera hardware abstraction layer.

S130: After receiving the tracking success information, the tracking device generates, based on the third target position, a third tracking identifier corresponding to the third target position.

Then, the $(n+1)^{th}$ frame of image and the third tracking identifier are displayed in the interface of the electronic device.

As shown in FIG. 7, in a specific embodiment, the third tracking identifier displayed in the interface of the mobile phone may be shown as 703 in FIG. 7.

S131: The logic judgment module generates tracking failure information, where the tracking success information represents that target tracking fails, that is, tracking is lost.

S132: The logic judgment module returns the third positions and the tracking failure information to the tracking device at the camera hardware abstraction layer.

Optionally, in this step, the logic judgment module may alternatively send only the tracking failure information to the tracking device at the camera hardware abstraction layer, instead of sending the third positions. This simplifies the algorithm and improves the operation efficiency of the algorithm.

S133: The tracking device stops tracking after receiving the tracking failure information.

After receiving the tracking failure information, the tracking device does not generate a tracking identifier, and does not display a tracking identifier in the interface. In addition, the tracking device stops tracking a current target. After a next frame of image is generated, the tracking device does not invoke the tracker in the camera arithmetic library.

It may be understood that in the tracking process, if a preset condition of exiting tracking is satisfied, the tracking device also stops tracking. The preset condition of exiting tracking may, for example, be switching of the image shooting mode and the like in the foregoing embodiment.

Alternatively, in the case in which target tracking is successful and the preset condition of exiting tracking is not satisfied, target tracking is performed on any subsequent frame of image in the video stream, that is, the $(n+x)^{th}$ frame of image, in a same method described in step S106 to step S133. In other words, after step S114, step S121, and step S130, it is assumed that n=n+1, step S106 is performed.

In the target tracking method provided in this embodiment, target searching is performed based on the local shallow network, the local deep network, and the global deep network. There is a progressive relationship among network depths, network widths, resolutions of input images, and search ranges of the local shallow network, the local deep network, and the global deep network. In this way, in the target tracking process, low-resolution shallow searching is first locally performed on the image through the local shallow network. If searching fails, low-resolution deep searching is locally performed on the image through the local deep network, that is, a search network depth and/or a search network width are/is increased, to improve accuracy of searching. If searching still fails through the local deep network, high-resolution deep searching is globally performed on the image through the global deep network, that is, a resolution of the input image is further increased, and the search range is expanded, to further improve accuracy of searching. In this way, for target tracking accuracy in a difficult scenario, tracking accuracy is improved, and possibility that target tracking is lost is reduced. In addition, in the searching process, based on a search result, the search depth is gradually increased, the resolution of the input image is improved, or the search range is expanded. In comparison to tracking performed through only the global deep network, the method prevents non-essential deep searching, high-resolution searching, or globally searching in a non-difficult scenario. This reduces operation complexity of an algorithm, improves real-time performance of target tracking, and reduces power consumption of the device.

In conclusion, in the method provided in this embodiment of this application, the local shallow network, the local deep network, and the global deep network may be adaptively selected, to achieve balance between tracking accuracy and power consumption and balance between tracking accuracy and real-time performance.

It should be noted that in some embodiments, target tracking may alternatively be performed only through the local shallow network and the global deep network. Specifically, in the embodiment shown in FIG. 6A to FIG. 6E, in step "S111: The logic judgment module determines whether the first confidence is larger than the first confidence threshold", if a judgment result is that the first confidence is not larger than the first confidence threshold, step S122 is performed, and step S115 to step S121 are not performed. In this way, the algorithm is simplified, and the operation efficiency of the algorithm is improved. Therefore, power consumption is reduced, and real-time performance of target tracking is improved.

Certainly, in some other embodiments, the target may alternatively be tracked through only the local shallow network and the local deep network. That is, in the target tracking method provided in this embodiment of this application, a search network may include all of the local shallow network, the local deep network, and the global deep network, namely, the local shallow network, the local deep network, and the global deep network, and may also include two of the local shallow network, the local deep network, and the global deep network. The search network may also include more networks than the local shallow network, the local deep network, and the global deep network. This is not limited in this embodiment of this application. In conclusion, there is a plurality (greater than or equal to two) of networks in the search network, and there is incremental effect on the plurality of networks in several dimensions, such as the search range, the resolution of the input image, the network depth, and the network width. In this way, when target tracking is performed through the plurality of networks, search intensity is gradually increased based on the search result, to improve accuracy of searching. In this way, for target tracking in a difficult scenario, tracking accuracy is improved, and possibility that target tracking is lost is reduced. In addition, in the searching process, the searching intensity is gradually increased based on the search result, to prevent excessive searching in the non-difficult scenario. This reduces the operation complexity of the algorithm, improves real-time performance of target tracking, and reduces the power consumption of the device.

Figure 8:
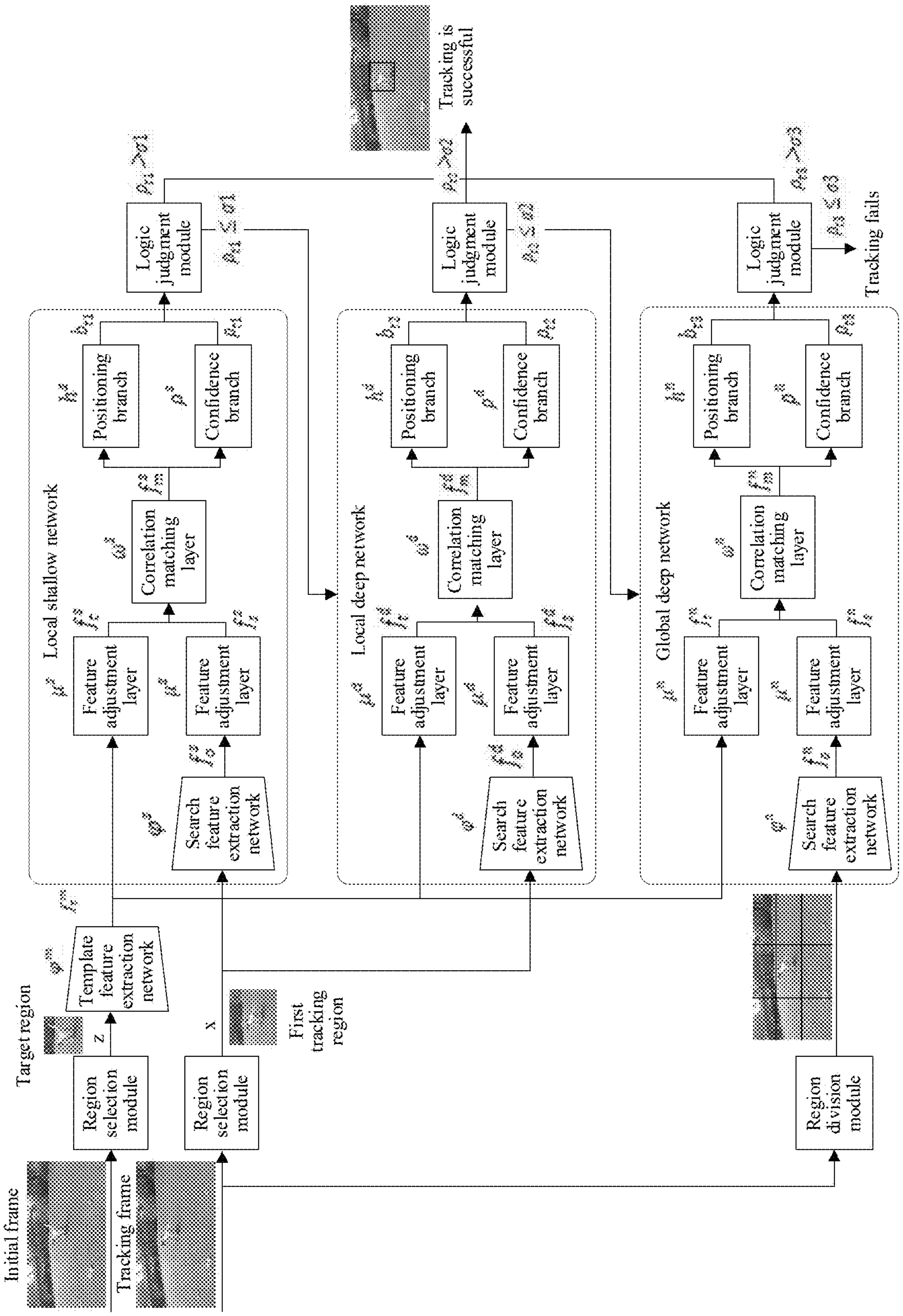
FIG. 8 is a schematic diagram of a structure of a search network and a target tracking process according to an embodiment of this application.
Figure 9A:
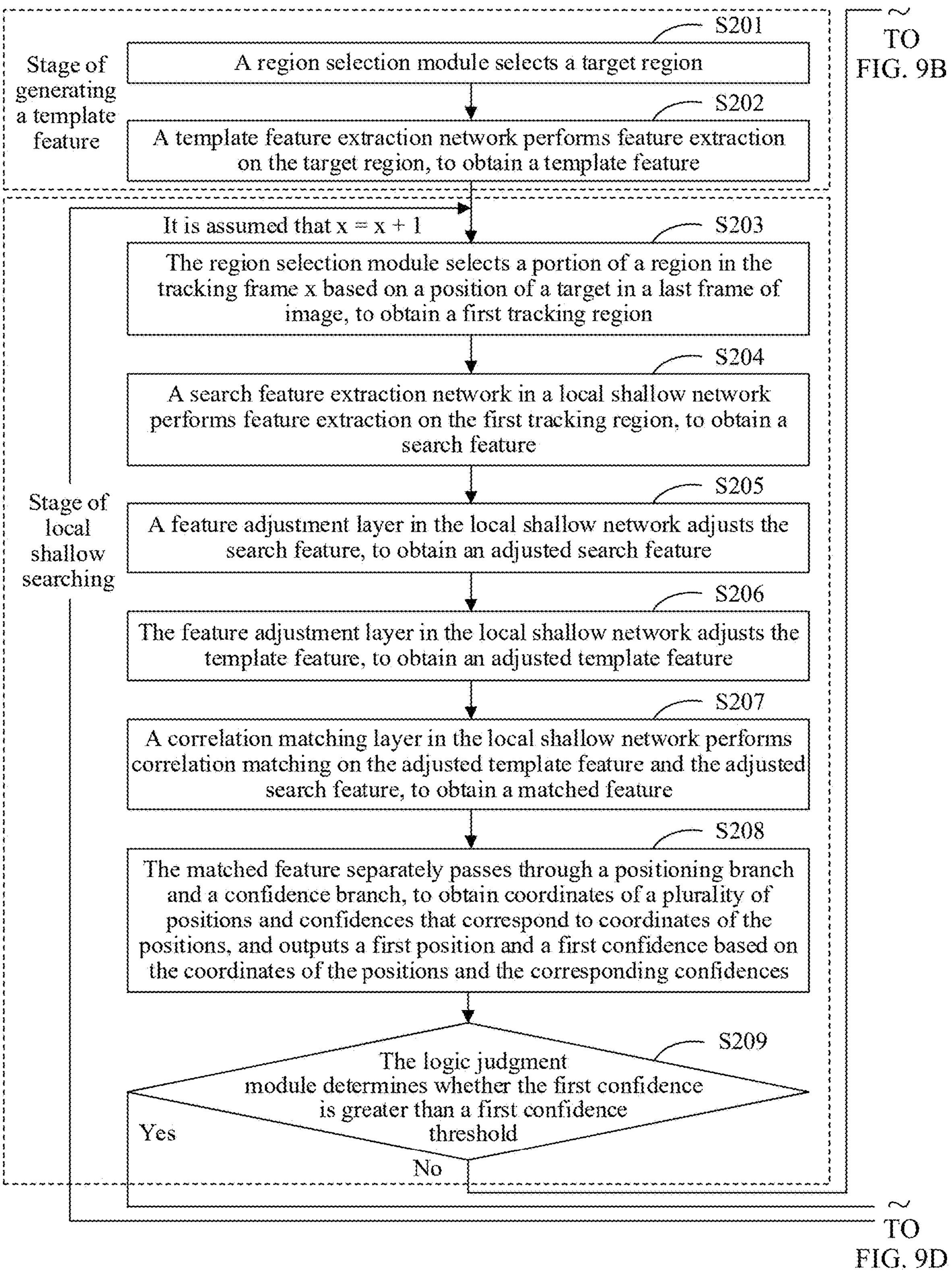
FIG. 9A to FIG. 9D are schematic flowcharts of another target tracking method according to an embodiment of this application.
Figure 9B:
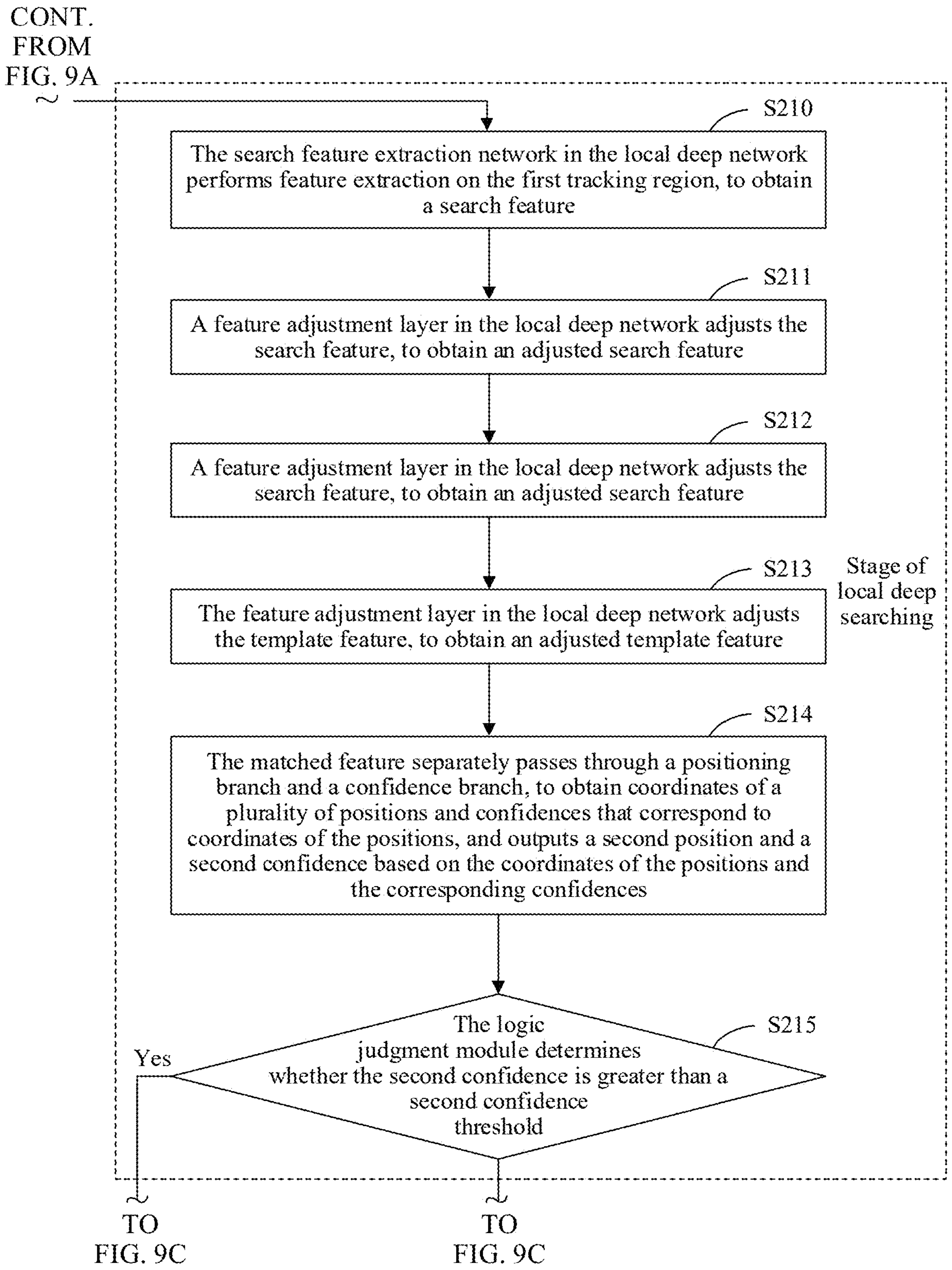
Figure 9C:
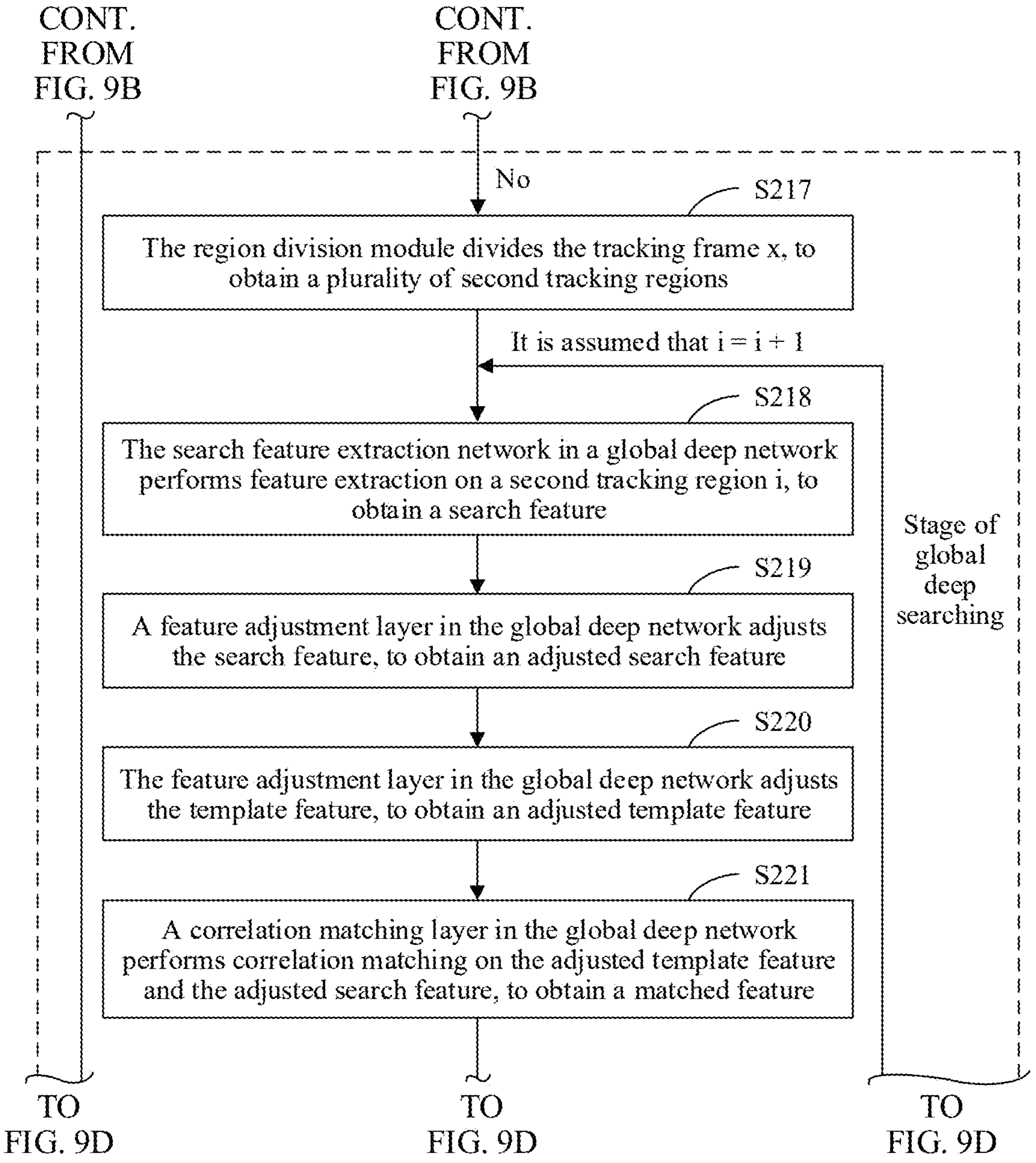
Figure 9D:
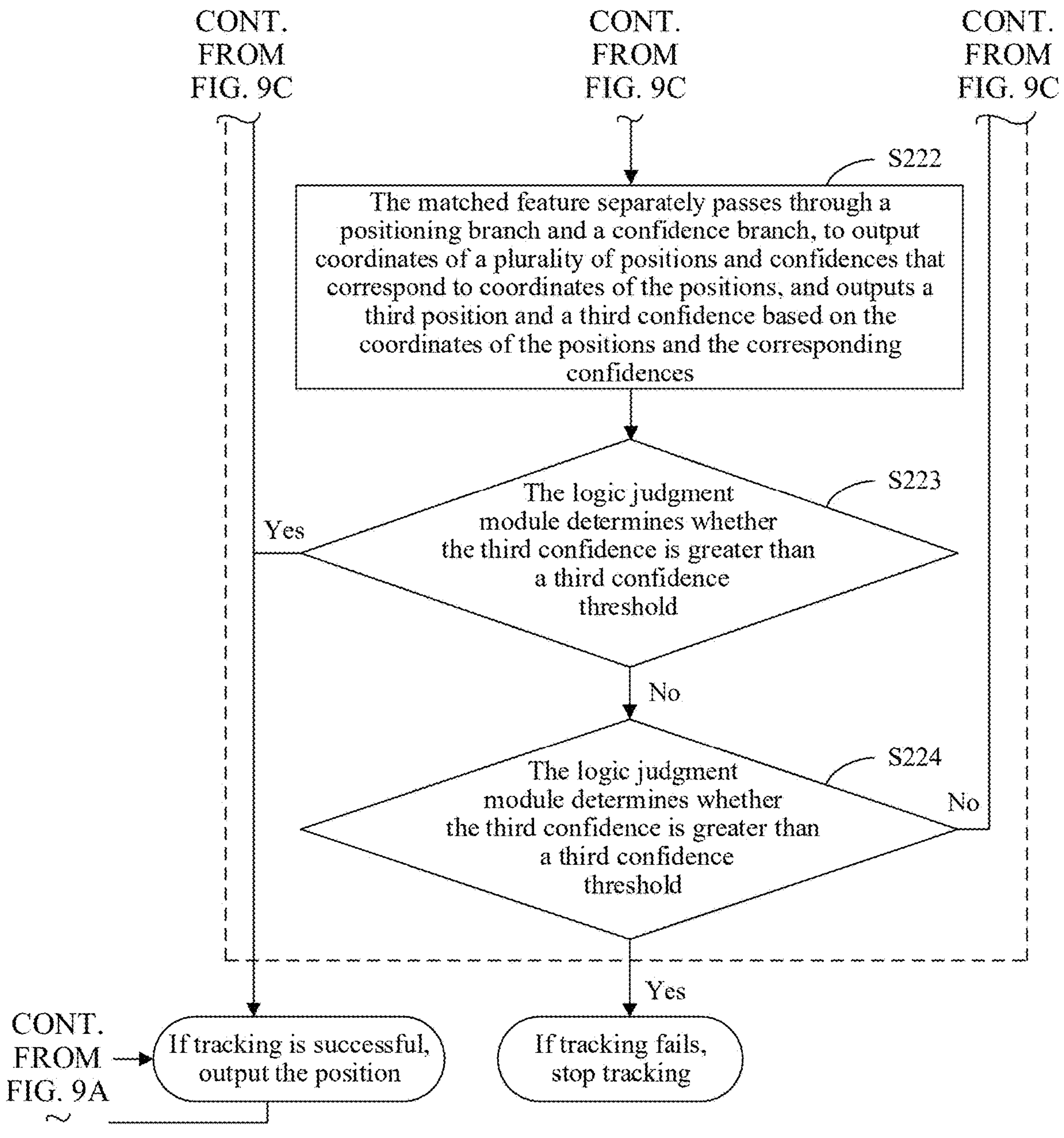

It may be understood that structures of the local shallow network, the local deep network, and the global deep network may be the same or not the same. For example, FIG. 8 is a schematic diagram of a structure of a search network and a target tracking process according to an embodiment of this application. As shown in FIG. 8, in this embodiment, a local shallow network, a local deep network, and a global deep network each may include a searching feature extraction network, a feature adjustment layer, a correlation matching layer, a positioning branch, and a classification branch. In networks, a search feature region network and a template feature extraction network share a weight. In other words, weights of network structure, structures of the search feature region network and the template feature extraction network in each network, and a filter are the same. However, a resolution of an input image may not be the same.

The following further describes target tracking according to embodiments of this application with reference to structures of the networks.

For example, FIG. 9A to FIG. 9D are schematic flowcharts of another target tracking method according to an embodiment of this application. As shown in FIG. 8 and FIG. 9A to FIG. 9D, the method includes the following steps.

1. Stage of Generating a Template Feature

S201: A region selection module selects a target region z in an initial frame.

Refer to step S102. Specifically, the region selection module may select the target region z centered on a position 1 tapped by a user, or centered on a position at which a center point of a detected target is located. The position 1 or the center point of the target is represented as $c_0=(x,y)c_0=(x,y)c_0=(x,y)$, and the target region z may be represented as $z \in R^{h \times w \times 3}$. In other words, a dimension of the target region z is h×w×3, where h represents that a value of a height is h, w represents that a value of a width is w, and 3 represents that a quantity of channels is 3 (three channels, namely, R, G, and B).

S202: A template feature extraction network $\varphi^m$ performs feature extraction on the target region, to obtain a template feature $f_t^m$:

$$f_t^m = \varphi^m(z) \tag{1}$$

2. Stage of Local Shallow Searching

For any tracking frame x, first enter a stage of local shallow searching, that is, perform step S203 to step 208.

S203: The region selection module selects a portion of a region in the tracking frame x based on a position of a target in a last frame of image, to obtain a first tracking region x.

Specifically, when the tracking frame x is a first tracking frame (that is, a first frame of image after an initial frame), the region selection module selects a first tracking region x in the tracking frame x based on a position of the target in the initial frame. In this case, the position of the target in the initial frame may be determined based on a detection result of the target, and the first tracking region x may be further selected. Optionally, a resolution of the first tracking region x is larger than a resolution of the target region, that is, H>h, and/or, W>w.

When the tracking frame x is a tracking frame after the first tracking frame, the region selection module selects the first tracking region x in the tracking frame x based on a position of the target in a last tracking frame (a tracking frame x−1). In this case, the position of the target in the last tracking frame may be obtained based on a tracking result of the last tracking frame, to select the first tracking region x.

Optionally, the region selection module may determine the position of the center point of the target in the last frame of image based on the position of the target in the last frame of image, and then select the first tracking region x, in a manner in which the position of the center point of the target in the last frame of image is used as a center. The position of the center point of the target is represented as $c_0=(x,y)$ $c_z=(x,y)c_0=(x,y)$, and the first tracking region x may be represented as $x \in R^{H \times W \times 3}$. In other words, a dimension of the first tracking region x is H×W×3, where H represents that a value of a height is H, W represents that a value of a width is W, and 3 represents that a quantity of channels is 3 (three channels, namely, R, G, and B).

In a specific embodiment, centered on the position of the center point of the target in the last frame of image, a target region z in the last frame or a first tracking region x−1 in the last frame is expanded by a preset multiple, to obtain the first tracking region x in the tracking frame x. For example, if the position of the target in the tracking frame x−1 is (100, 100, 200, 200), and a preset zoom multiple is 2 times, based on the position of the center point of the target in the tracking frame x−1, the position of the first tracking region x in the tracking frame x is (50, 50, 250, 250), that is, the first tracking region x is $x \in R^{200 \times 200 \times 3}$.

S204: A search feature extraction network $\varphi^s$ in a local shallow network performs feature extraction on the first tracking region x, to obtain a search feature $f_o^s$:

$$f_0^s = \varphi^s(x) \tag{2}$$

S205: A feature adjustment layer $\mu^s$ in the local shallow network adjusts the search feature $f_o^s$, to obtain an adjusted search feature $f_s^s$:

$$f_s^s = \mu^s(\varphi^s(x)) \quad (3)$$

S206: In addition, the feature adjustment layer $\mu^s$ in the local shallow network adjusts the template feature $$f_t^m,$$

to obtain an adjusted template feature $$f_t^s:$$

$$f_t^s = \mu^s(\varphi^m(z)) \quad (4)$$

S207: A correlation matching layer $\omega^s$ in the local shallow network performs correlation matching on the adjusted template feature $$f_t^s$$

and the adjusted search feature $$f_s^s,$$

to obtain a matched feature $$f_m^s:$$

$$f_m^s = \omega^s(f_t^s, f_s^s) \quad (5)$$

Optionally, a specific implementation of the correlation matching layer may be cross-correlation matching based on a depthwise separable convolution, or may be cross-correlation matching based on an encoding-decoding structure (transformer). This is not limited in this embodiment of this application. Similarly, a specific structure and implementation of another sub-network in the networks are not limited in this embodiment of this application, and are designed for implementing functions of the specific structure and the implementation based on an actual need.

S208: The matched feature $$f_m^s$$

separately passes through a positioning branch $h^s$ and a confidence branch $\rho^s$, to obtain coordinates b1=(l,t,b,r) of a plurality of positions and confidences ρ1 that correspond to coordinates b1 of each position, and output a first position $b_{t1}$ and a first confidence $\rho_{t1}$ based on the coordinates b1 of each position and the corresponding confidence ρ1.

$$b1 = h^s(\omega^s(f_t^s, f_s^s)) \quad (6)$$

$$\rho 1 = \rho^s(\omega^s(f_t^s, f_s^s)) \quad (7)$$

Coordinates b1 of the position is used to limit a region, where 1 represents a coordinate value x of an upper left vertex of the region, t represents a coordinate value y of the upper left region of the region, b represents a coordinate value x of a lower right vertex of the region, and r represents a coordinate value y of the lower right vertex of the region.

A maximum value $\rho_{t1}$ in the plurality of confidence ρ1 is used as an output of the local shallow network, to obtain the first confidence $\rho_{t1}$. Coordinates $b_{t1}$ of a position corresponding to the first confidence $\rho_{t1}$ are used as an output of the local shallow network, to obtain the first position $b_{t1}$.

S209: The logic judgment module determines whether the first confidence $\rho_{t1}$ is larger than a first confidence threshold σ1.

If the first confidence $\rho_{t1}$ is larger than the first confidence threshold σ1, it indicates that there is a target in the first tracking region, and target tracking performed through the local shallow network is successful, that is, tracking is successful, the logic judgment module sends the first position $b_{t1}$ and tracking success information to a tracking device, and an electronic device displays a tracking identifier corresponding to the first position $b_{t1}$ as shown in FIG. 8. Then, target tracking on a next tracking frame x+1 is performed. That is, it is assumed that x=x+1, step S203 is performed.

If the first confidence $\rho_{t1}$ is lower than or equal to the first confidence threshold σ1, it indicates that no target exists in the first tracking region, and target tracking performed through the local shallow network fails, to enter a stage of local deep searching, that is, step S210 to step S215 are performed.

3. Stage of Local Deep Searching

S210: The search feature extraction network $\varphi^d$ in the local deep network performs feature extraction on the first tracking region x, to obtain a search feature $$f_o^d:$$

$$f_o^d = \varphi^d(x) \quad (8)$$

S211: A feature adjustment layer $\mu^d$ in the local deep network adjusts the search feature $$f_o^d,$$

to obtain an adjusted search feature $$f_s^d:$$

$$f_s^d = \mu^d(\varphi^d(x)) \quad (9)$$

S212: In addition, the feature adjustment layer $\omega^d$ in the local deep network adjusts the template feature $$f_t^m,$$

to obtain an adjusted template feature $$f_t^d:$$

$$f_t^d = \mu^d(\varphi^m(z)) \quad (10)$$

S213: A correlation matching layer $\omega^d$ in the local deep network performs correlation matching on the adjusted template feature $$f_t^d$$

and the adjusted search feature $$f_s^d,$$

to obtain a matched feature $$f_m^d:$$

$$f_m^d = \omega^d(f_t^d, f_s^d) \quad (11)$$

S214: The matched feature $$f_m^d$$

separately passes through a positioning branch $h^d$ and a confidence branch $\rho^d$, to obtain coordinates b2=(l,t,b,r) of a plurality of positions and confidences ρ2 that correspond to coordinates b2 of each position, and outputs a second position $b_{t2}$ and a second confidence $\rho_{t2}$ based on the coordinates b2 of each position and the corresponding confidence ρ2.

$$b2 = h^d(\omega^d(f_t^d, f_s^d)) \quad (12)$$

$$\rho 2 = \rho^d(\omega^d(f_t^d, f_s^d)) \quad (13)$$

A maximum value $\rho_{t2}$ in the plurality of confidence ρ2 is used as an output of the local deep network, to obtain the second confidence $\rho_{t2}$. Coordinates $b_{t2}$ of a position corresponding to the second confidence $\rho_{t2}$ are used as an output of the local deep network, to obtain the second position $b_{t2}$.

S215: The logic judgment module determines whether the second confidence $\rho_{t2}$ is larger than a second confidence threshold σ2.

If the second confidence $\rho_{t2}$ is larger than the second confidence threshold σ2, it indicates that there is a target in the first tracking region, and target tracking performed through the local deep network is successful, that is, tracking is successful, the logic judgment module sends the second position $b_{t2}$ and tracking success information to a tracking device, and the electronic device displays a tracking identifier corresponding to the second position $b_{t2}$ as shown in FIG. 8. Then, target tracking on the next tracking frame x+1 is performed. That is, it is assumed that x=x+1, step S203 is performed.

If the second confidence $\rho_{t2}$ is lower than or equal to the second confidence threshold σ2, it indicates that no target exists in the first tracking region, and target tracking performed through the local deep network fails, to enter a stage of global deep searching, that is, step S217 to step S224 are performed.

4. Stage of Global Deep Searching

S217: The region division module divides the tracking frame x, to obtain a plurality of second tracking regions.

The region division module separately inputs the second tracking regions into a global deep network. For any second tracking regions i, the global deep network performs S218 to S224:

S218: The search feature extraction network $\varphi^n$ in a global deep network performs feature extraction on a second tracking region i, to obtain a search feature $$f_o^n:$$

$$f_0^n = \varphi^n(x) \quad (14)$$

S219: A feature adjustment layer $\mu^n$ in the global deep network adjusts the search feature $$f_o^n,$$

to obtain an adjusted search feature $$f_s^n:$$

$$f_s^n = \mu^n(\varphi^n(x)) \quad (15)$$

S220: In addition, the feature adjustment layer $\mu^n$ in the global deep network adjusts the template feature $$f_t^m,$$

to obtain an adjusted template feature $f_t^n$:

$$f_t^n = \mu^n(\varphi^m(z)) \quad (16)$$

S221: A correlation matching layer $\omega^n$ in the global deep network performs correlation matching on the adjusted template feature $f_t^n$ and the adjusted search feature $f_s^n$, to obtain a matched feature $f_m^n$:

$$f_m^n = \omega^n(f_t^n, f_s^n) \quad (17)$$

S222: The matched feature $f_m^n$ separately passes through a positioning branch $h^n$ and a confidence branch $\rho^n$, to obtain coordinates b3=(l,t,b,r) of a plurality of positions and confidences ρ3 that correspond to coordinates b3 of each position, and outputs a third position $b_{t3}$ and a third confidence $\rho_{t3}$ based on the coordinates b3 of each position and the corresponding confidence ρ3.

$$b3 = h^n(\omega^n(f_t^n, f_s^n)) \quad (18)$$

$$\rho 3 = \rho^n(\omega^n(f_t^n, f_s^n)) \quad (19)$$

A maximum value $\rho_{t3}$ in the plurality of confidence ρ3 is used as an output of the global deep network, to obtain the third confidence $\rho_{t3}$. Coordinates $b_{t3}$ of a position corresponding to the third confidence $\rho_{t3}$ are used as an output of the global deep network, to obtain the third position $b_{t3}$.

S223: The logic judgment module determines whether the third confidence $\rho_{t3}$ is larger than a third confidence threshold σ3.

If the third confidence $\rho_{t3}$ is larger than the third confidence threshold σ3, it is indicated that the target exists in the second tracking region i, tracking is successful, and the electronic device displays a tracking identifier (as shown in FIG. 8) corresponding to the third position $b_{t3}$, ends tracking of a current tracking frame x, and performs target tracking on the next tracking frame x+1. If it is assumed that x=x+1, step S203 is performed.

If the third confidence $\rho_{t3}$ is lower than or equal to the third confidence threshold σ3, it is indicated that no target exists in the second tracking region i, and step S224 is performed.

S224: Determine whether all the second tracking regions are traversed. If all the second tracking regions are not traversed completely, it is assumed that i=i+1, and step S218 is performed, that is, global deep searching is performed on a next second tracking region i+1. If all the second tracking regions are traversed, it is determined that tracking is lost, that is, tracking fails, the electronic device does not display the tracking identifier, and tracking is stopped.

Optionally, in this step, if no target exists in any second tracking regions i and it is determined that all the second tracking regions are not traversed completely, step S218 is directly performed, to perform searching in the next second tracking region. That is, step S218 to step S224 are performed cyclically until tracking is successful or tracking is lost (that is, a tracking result is obtained).

In a possible implementation, if no target exists in the second tracking region i and it is determined that all the second tracking regions are traversed, target tracking on the next tracking frame x+1 may be started first. When target tracking is performed on the next frame tracking frame x+1, step S218 to step S224 are performed once, to perform searching in the next second tracking region i+1. By analogy, when target tracking is performed on each tracking frame, searching is performed in one second tracking region until a tracking result is obtained.

Specifically, at the tracking frame x, step S218 to step S224 are performed, to perform searching in the second tracking region i in the plurality of second tracking regions. If searching is successful, the tracking identifier is displayed, tracking performed on the tracking frame x ends, and target tracking performed on the tracking frame x+1 is started. If no target exists in the second tracking region i and it is determined that all the second tracking regions are traversed, target tracking performed on the tracking frame x+1 is started first. When target tracking is performed on the tracking frame x+1, step S218 to step S224 are performed, to perform searching in the second tracking region i+1. If searching is successful, the tracking identifier is displayed, tracking performed on the tracking frame x+1 ends, and target tracking performed on a tracking frame x+2 is started. If no target exists in the second tracking region i+1, searching is continuously performed in the second tracking region i+2 according to the above process during target tracking performed on the tracking frame x+2, until a tracking result is obtained.

In other words, in this embodiment, when global deep searching is performed through the global deep network, a global deep searching process may be divided and delayed, and performed with tracking on a subsequent tracking frame. This prevents the video freezing caused by a long time of global deep searching, and improves user experience.

The following describes specific structures of the local shallow network, the local deep network, and the global deep network in this application.

As described above, at least one of network widths and network depths of the local deep network and the global deep network is larger than at least one of the network width and the network depth of the local shallow network. In other words, in comparison to the local shallow network, the local deep network and the global deep network are and/or wider. A resolution of an input image of the global deep network may be larger than a resolution of the local shallow network and the local deep network. In addition, global searching is performed on the image through the global deep network, and local searching is performed on the image through the local shallow network and the local deep network.

In a specific embodiment, resolutions, quantities of channels, and network depths of the local shallow network, the local deep network, and the global deep network may be shown in Table 1 below:

TABLE 1

| | Resolution of input image | Quantity of feature channels | Quantity of network layers |
|---|---|---|---|
| Local shallow network | 255 × 255 | 128 | 21 |
| Local deep network | 255 × 255 | 256 | 23 |
| Global deep network | 353 × 353 | 256 | 23 |

through the local shallow network, the local deep network, and the global deep network, to achieve balance between target tracking accuracy and power consumption and balance between target tracking accuracy and real-time performance. In addition, structures, depths, and widths of the local shallow network, the local deep network, and the global deep network may be adjusted based on an actual use scenario and need, to facilitate expansion and adaptation of the network, meet use needs of different use platforms, and improve applicability of the method.

It should be noted that data provided in table 1 is merely an example, and does not impose any limitation on the local shallow network, the local deep network, and the global deep network.

Optionally, the search feature extraction network, the feature adjustment layer, the correlation matching layer, the position branch, the confidence branch, the network depths, the network widths of the local shallow network, the local deep network, and the global deep network in this embodiment of this application may be designed and adjusted based on an actual need. Table 2 shows an example of implementation:

TABLE 2

| Network layer | Output of tracking frame | Output of initial frame | Quantity of layers | Quantity of channels | Step |
|---|---|---|---|---|---|
| **Search feature extraction network** | | | | | |
| Input | 255 × 255 | 127 × 127 | | 3 | |
| conv1 | 128 × 128 | 64 × 64 | 1 | 24 | 2 |
| maxpool | 64 × 64 | 32 × 32 | 1 | 24 | 2 |
| stage2 | 32 × 32 | 16 × 16 | 1 | 48 | 2 |
| | 32 × 32 | 16 × 16 | 3 | 48 | 1 |
| stage3 | 32 × 32 | 16 × 16 | 1 | 96 | 1 |
| | 32 × 32 | 16 × 16 | 7 | 96 | 1 |
| stage4 | 32 × 32 | 16 × 16 | 1 | 192 | 1 |
| | 32 × 32 | 16 × 16 | 3 | 192 | 1 |
| conv2 | 32 × 32 | 16 × 16 | 1 | 256 | 1 |
| center crop | 24 × 24 | 8 × 8 | 1 | 256 | 1 |
| **Feature adjustment layer** | | | | | |
| conv3 | 22 × 22 | 6 × 6 | 1 | 256 | 1 |
| **Correlation matching layer** | | | | | |
| corrconv | 17 × 17 | | 1 | 256 | 1 |
| **Positioning branch** | | | | | |
| conv4 | 15 × 15 | | 2 | 4 | 1 |
| **Confidence branch** | | | | | |
| conv5 | 15 × 15 | | 2 | 1 | 1 |

The following describes tracking effect of the target tracking method provided in embodiments of this application with reference to scenarios and accompanying drawings.

Scenario 1: An Unmanned Aerial Vehicle Tracks a Target

Figure 10:
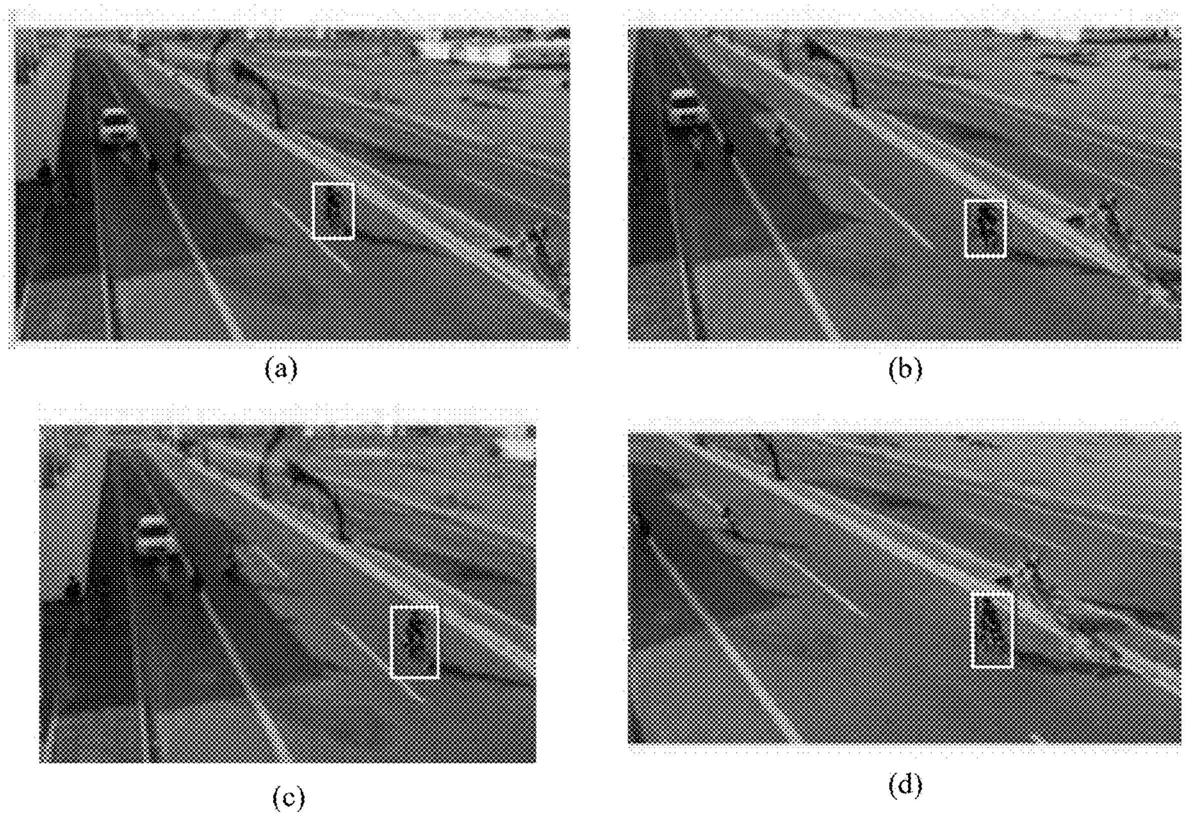
FIG. 10 is a schematic diagram of a target tracking result of an unmanned aerial vehicle according to an embodiment of this application.

For example, FIG. 10 is a schematic diagram of a target tracking result of an unmanned aerial vehicle according to an embodiment of this application. In this embodiment, the unmanned aerial vehicle tracks a target people in an image through the method provided in this embodiment of this application. In four consecutive frames of image, tracking results are shown in (a) in FIG. 10, (b) in FIG. 10, (c) in FIG. 10, and (d) in FIG. 10. It can be seen from the figures that the target may be accurately tracked through the method.

conv represents a convolutional layer. maxpool represents a maximum pooling layer. stage represents a stage. center crop represents center cropping. corrconv represents a correlation convolutional layer.

In the target tracking method provided in this embodiment of this application, the target is searched layer by layer Scenario 2: Data is Automatically Annotated.

Figure 11:
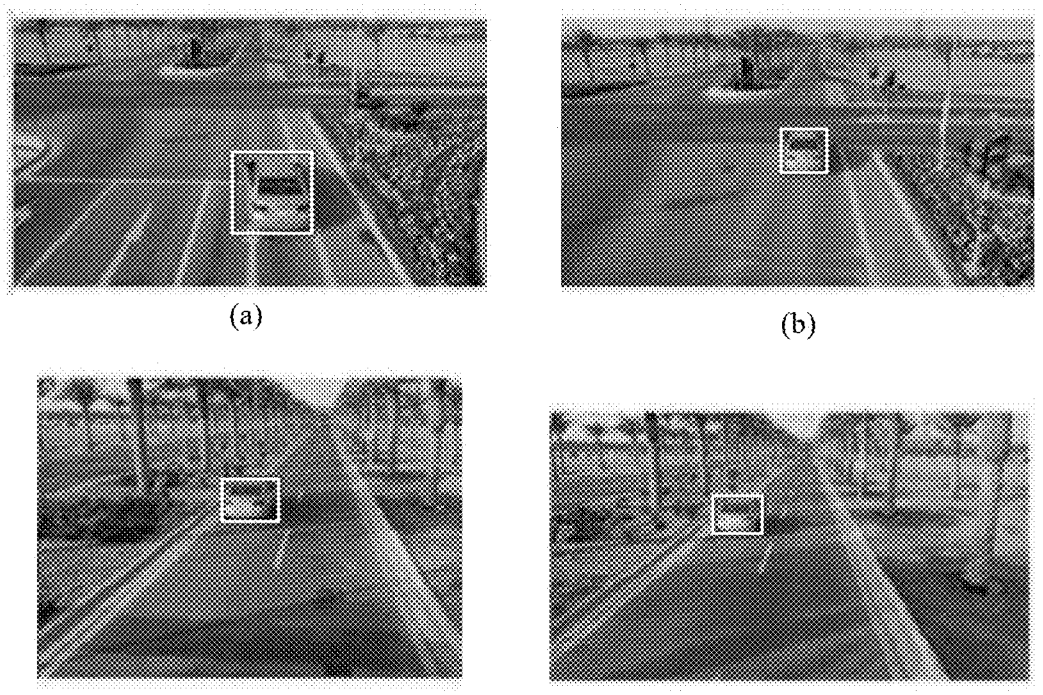
FIG. 11 is a schematic diagram of an automatically annotated result of data according to an embodiment of this application.

For example, FIG. 11 is a schematic diagram of an automatically annotated result of data according to an embodiment of this application. In this embodiment, the target tracking method provided in this embodiment of this application is applied to a vehicle recorder mounted in a vehicle. During traveling of the vehicle, the vehicle recorder obtains video data of a road in real time, and through the target tracking method, a target vehicle in each frame of image is tracked and annotated, and tracking results and annotation results are shown in the (a) in FIG. 11, the (b) in FIG. 11, (c) in FIG. 11, and (d) in FIG. 11. It can be seen from the figures, the target may be tracked and annotated through the method.

Examples of the target tracking method provided in embodiments of in this application are described in detail above. It may be understood that, to implement the foregoing functions, the electronic device includes corresponding hardware and/or software modules for performing the functions. A person skilled in the art should be easily aware that, in combination with units and algorithm steps in embodiments described in the examples disclosed in this specification, this application can be implemented by hardware or a combination of hardware and computer software. Whether a function is performed by hardware or computer software driving hardware depends on particular applications and design constraints of the technical solutions. A person of skill in the art may use different methods to implement the described functions with reference to embodiments for each particular application, but it should not be considered that the implementation goes beyond the scope of this application.

In embodiments of this application, functional modules of the electronic device may be divided according to the foregoing method example. For example, each functional module may be divided according to each function, such as a detection unit, a processing unit, and a display unit, or two or more functions may be integrated into one module. The above integrated module may be implemented in a form of hardware, or may be implemented in a form of a functional module of software. It should be noted that the module division in embodiments of this application is an example and is merely logical function division, and may be another division in actual implementation.

It should be noted that all related content of the steps in the foregoing method embodiments may be cited in function description of corresponding functional modules. Details are not described herein.

The electronic device provided in embodiments of this application is configured to perform the target tracking method, so that an effect same as that in the foregoing implementation can be achieved.

When an integrated unit is used, the electronic device may further include a processing module, a storage module, and a communication module. The processing module may be configured to control and manage an operation of the electronic device. The storage module may be configured to support the electronic device in executing stored program code, data, and the like. The communication module may be configured to support communication between the electronic device and another device.

The processing module may be a processor or a controller. The processor or controller may implement or conduct example logical block diagrams, modules, and circuits that are described in content disclosed in this application. The processor may alternatively be a combination for implementing a computing function, for example, a combination including one or more microprocessors or a combination of a digital signal processor (digital signal processing, DSP) and a microprocessor. The storage module may be a memory. The communication module may be specifically a device, for example, a radio frequency circuit, a Bluetooth chip, or a Wi-Fi chip, that interacts with another electronic device.

In an embodiment, when the processing module is a processor and the storage module is a memory, the electronic device in embodiments may be a device having the structure shown in FIG. 2.

An embodiment of this application further provides a computer-readable storage medium. The computer-readable storage medium stores a computer program, and the computer program, when executed by a processor, causes the processor to perform the target tracking method in any one of the foregoing embodiments.

An embodiment of this application further provides a computer program product. When the computer program product is run on a computer, the computer is enabled to perform the related steps to implement the target tracking method in the foregoing embodiments.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, to enable the chip to perform the target tracking method in the foregoing method embodiments.

The electronic device, the computer-readable storage medium, the computer program product, or the chip provided in embodiments is configured to perform the corresponding method provided above. Therefore, for beneficial effects that can be achieved, refer to the beneficial effects in the corresponding method provided above. Details are not described herein again.

According to the foregoing descriptions of the implementations, a person skilled in the art may understand that for the purpose of convenient and brief description, division into the foregoing functional modules is merely used as an example for illustration. During actual application, the foregoing functions can be allocated to different functional modules for implementation based on a requirement, that is, an inner structure of an apparatus is divided into different functional modules to implement all or a part of the functions described above.

In the several embodiments provided in this application, it should be understood that the disclosed apparatus and method may be implemented in other manners. For example, the described apparatus embodiment is merely an example. For example, the module or unit division is merely logical function division and may be another division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, may be located in one place, or may be distributed in multiple different places. Some or all of the units may be selected according to actual needs to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware or a software function unit.

If the integrated unit is implemented in the form of a software functional unit and sold or used as an independent product, the integrated unit may be stored in a readable storage medium. Based on such an understanding, the technical solutions in embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in embodiments of this invention. The foregoing storage medium includes any medium that can store program code, such as a USB flash drive, a removable hard disk, a read only memory (read only memory, ROM), a random access memory (random access memory, RAM), a magnetic disk, or an optical disc.

Content above merely describes specific implementations of this application, but the protection scope of this application is not limited thereto. Any person skilled in the art can easily conceive modifications or replacements within the technical scope of this application, and these modifications or replacements shall fall within the protection scope of this application. Therefore, the protection scope of this application shall be subject to the protection scope of the claims.

The invention claimed is:

1. A target tracking method, comprising:

displaying a first shooting interface, wherein a first region of the first shooting interface displays a video stream shot by a camera lens;

receiving a first operation, when the first region displays an $n^{th}$ frame of image of the video stream, provided to the $n^{th}$ frame of image by a user, wherein n is a positive integer;

performing feature extraction on the $n^{th}$ frame of image, in response to the first operation, to obtain a template feature, wherein the $n^{th}$ frame of image comprises a target;

selecting a first tracking region from an $(n+x)^{th}$ frame of image of the video stream, wherein x is a positive integer; and searching the first tracking region through a first convolutional neural network (CNN) based on the template feature, and outputting a first position and a first confidence that corresponds to the first position, wherein whether the $(n+x)^{th}$ frame of image comprises the target is based on the first confidence, wherein if the first confidence indicates that the $(n+x)^{th}$ frame of image does not comprise the target, the method further comprises searching the first tracking region through a second CNN based on the template feature, and outputting a second position and a second confidence that corresponds to the second position, and wherein the first CNN and the second CNN satisfy at least one condition in a first set of preset conditions that comprises: a network depth of the second CNN being greater than a network depth of the first CNN, a network width of the second CNN being greater than a network width of the first CNN, and a resolution of an input image of the second CNN being greater than a resolution of an input image of the first CNN.

2. The method of claim 1, wherein if the second confidence indicates that the $(n+x)^{th}$ frame of image does not comprise the target, the method further comprises searching the first tracking region through a third network based on the template feature, wherein the second CNN and the third network satisfy at least one condition in a second set of preset conditions that comprises: a network depth of the third network being greater than the network depth of the second CNN, a network width of the third network being greater than the network width of the second CNN, and a resolution of an input image of the third network being greater than the resolution of the input image of the second CNN.

3. The method of claim 2, wherein at least one of the network depth and the network width of the second network CNN is greater than at least one of the network depth and the network width of the first CNN, wherein at least one of the network depth and the network width of the third network is greater than at least one of the network depth and the network width of the first CNN, and wherein the resolution of the input image of the third network is separately greater than the resolution of the input image of the first CNN and the resolution of the input image of the second CNN.

4. The method of claim 2, wherein the $(n+x)^{th}$ frame of image comprises the target, based on the first confidence, if the first confidence is greater than a first confidence threshold, and wherein the $(n+x)^{th}$ frame of image does not comprise the target, based on the first confidence, if the first confidence is less than or equal to the first confidence threshold.

5. The method of claim 4, wherein selecting the first tracking region from the $(n+x)^{th}$ frame of image comprises selecting a portion of a region in the $(n+x)^{th}$ frame of image based on a position of the target in a $(n+x-1)^{th}$ frame of image of the video stream to obtain the first tracking region.

6. The method of claim 4, further comprising outputting the first position if the $(n+x)^{th}$ frame of image comprises the target based on the first confidence, wherein the first position represents a position of the target in the $(n+x)^{th}$ frame of image.

7. The method of claim 4, wherein the $(n+x)^{th}$ frame of image comprises the target, based on the second confidence, if the second confidence is greater than a second confidence threshold, and wherein the $(n+x)^{th}$ frame of image does not comprise the target, based on the second confidence, if the second confidence is less than or equal to the second confidence threshold.

8. The method of claim 7, further comprising outputting the second position if the $(n+x)^{th}$ frame of image comprises the target based on the second confidence, wherein the second position represents the position of the target in the $(n+x)^{th}$ frame of image.

9. The method of claim 4, wherein a search range of the third network for the $(n+x)^{th}$ frame of image is separately greater than a search range of the first CNN for the $(n+x)^{th}$ frame of image and a search range of the second CNN for the $(n+x)^{th}$ frame of image.

10. The method of claim 9, wherein searching the first tracking region through the third network further comprises:

performing region division on the $(n+x)^{th}$ frame of image, to obtain a plurality of second tracking regions; and separately searching in the plurality of second tracking regions through the third network based on the template feature, and outputting a plurality of third positions and third confidences that correspond to the third positions, wherein the $(n+x)^{th}$ frame of image comprises the target if a third target confidence that is greater than a third confidence threshold exists in the plurality of third confidences, and wherein the $(n+x)^{th}$ frame of image does not comprise the target if the third target confidence that is greater than the third confidence threshold does not exist in the plurality of third confidences.

11. The method of claim 10, wherein a resolution of at least one second tracking region in the plurality of second tracking regions is greater than a resolution of the first tracking region.

12. The method of claim 10, further comprising:

outputting a third target position if the $(n+x)^{th}$ frame of image comprises the target based on the third network, wherein the third target position is a third position corresponding to the third target confidence, and the third target position represents the position of the target in the $(n+x)^{th}$ frame of image; and stopping tracking the target if the $(n+x)^{th}$ frame of image does not comprise the target based on the third network.

13. The method of claim 1, wherein the first operation is a tap operation, and the method further comprises:

selecting a target region from the $n^{th}$ frame of image based on a tap position of the first operation; and performing feature extraction on the target region to generate the template feature.

14. An electronic device, comprising:

one or more processors; and a memory coupled to the one or more processors and configured to store instructions that, when executed by the one or more processors, cause the electronic device to be configured to:

display a first shooting interface, wherein a first region of the first shooting interface displays a video stream shot by a camera lens;

receive a first operation, when the first region displays an $n^{th}$ frame of image of the video stream, provided to the $n^{th}$ frame of image by a user, wherein n is a positive integer;

perform feature extraction on the $n^{th}$ frame of image, in response to the first operation, to obtain a template feature, wherein the $n^{th}$ frame of image comprises a target;

select a first tracking region from an $(n+x)^{th}$ frame of image of the video stream, wherein x is a positive integer; and search the first tracking region through a first convolutional neural network (CNN) based on the template feature, and output a first position and a first confidence that corresponds to the first position, wherein whether the $(n+x)^{th}$ frame of image comprises the target is based on the first confidence, wherein if the first confidence indicates that the $(n+x)^{th}$ frame of image does not comprise the target, the electronic device is further configured to search the first tracking region through a second CNN based on the template feature, and output a second position and a second confidence that corresponds to the second position, and wherein the first CNN and the second CNN satisfy at least one condition in a first set of preset conditions that comprises: a network depth of the second CNN being greater than a network depth of the first CNN, a network width of the second CNN being greater than a network width of the first CNN, and a resolution of an input image of the second CNN being greater than a resolution of an input image of the first CNN.

15. The electronic device of claim 14, wherein if the second confidence indicates that the $(n+x)^{th}$ frame of image does not comprise the target, the electronic device is further configured to search the first tracking region through a third network based on the template feature, wherein the second CNN and the third network satisfy at least one condition in a second set of preset conditions that comprises: a network depth of the third network being greater than the network depth of the second CNN, a network width of the third network being greater than the network width of the second CNN, and a resolution of an input image of the third network being greater than the resolution of the input image of the second CNN.

16. The electronic device of claim 15, wherein the $(n+x)^{th}$ frame of image comprises the target, based on the first confidence, if the first confidence is greater than a first confidence threshold, and wherein the $(n+x)^{th}$ frame of image does not comprise the target, based on the first confidence, if the first confidence is less than or equal to the first confidence threshold.

17. The electronic device of claim 16, wherein the $(n+x)^{th}$ frame of image comprises the target, based on the second confidence, if the second confidence is greater than a second confidence threshold, and wherein the $(n+x)^{th}$ frame of image does not comprise the target, based on the second confidence, if the second confidence is less than or equal to the second confidence threshold.

18. The electronic device of claim 16, wherein a search range of the third network for the $(n+x)^{th}$ frame of image is separately greater than a search range of the first CNN for the $(n+x)^{th}$ frame of image and a search range of the second CNN for the $(n+x)^{th}$ frame of image, and wherein searching the first racking region through the third network further comprises:

performing region division on the $(n+x)^{th}$ frame of image, to obtain a plurality of second tracking regions; and separately searching in the plurality of second tracking regions through the third network based on the template feature, and outputting a plurality of third positions and third confidences that correspond to the third positions, wherein the $(n+x)^{th}$ frame of image comprises the target if a third target confidence that is greater than a third confidence threshold exists in the plurality of third confidences, and wherein the $(n+x)^{th}$ frame of image does not comprise the target if the third target confidence that is greater than the third confidence threshold does not exist in the plurality of third confidences.

19. The electronic device according to claim 18, wherein the instructions, when executed by the one or more processors, further cause the electronic device to be configured to:

output a third target position if the $(n+x)^{th}$ frame of image comprises the target based on the third network, wherein the third target position is a third position corresponding to the third target confidence, and the third target position represents the position of the target in the $(n+x)^{th}$ frame of image; and stop tracking the target if the $(n+x)^{th}$ frame of image does not comprise the target based on the third network.

20. A non-transitory computer-readable storage medium storing instructions that, when executed by one or more processors of an electronic device, cause the electronic device to be configured to:

display a first shooting interface, wherein a first region of the first shooting interface displays a video stream shot by a camera lens;

receive a first operation, when the first region displays an $n^{th}$ frame of image of the video stream, provided to the $n^{th}$ frame of image by a user, wherein n is a positive integer;

perform feature extraction on the $n^{th}$ frame of image, in response to the first operation, to obtain a template feature, wherein the $n^{th}$ frame of image comprises a target;

select a first tracking region from an $(n+x)^{th}$ frame of image of the video stream, wherein x is a positive integer; and search the first tracking region through a first convolutional neural network (CNN) based on the template feature, and output a first position and a first confidence that corresponds to the first position, wherein whether the $(n+x)^{th}$ frame of image comprises the target is based on the first confidence, wherein if the first confidence indicates that the $(n+x)^{th}$ frame of image does not comprise the target, the electronic device is further configured to search the first tracking region through a second CNN based on the template feature, and output a second position and a second confidence that corresponds to the second position, and wherein the first CNN and the second CNN satisfy at least one condition in a first set of preset conditions that comprises: a network depth of the second CNN being greater than a network depth of the first CNN, a network width of the second CNN being greater than a network width of the first CNN, and a resolution of an input image of the second CNN being greater than a resolution of an input image of the first CNN.

* * * * *